US010315681B2

(12) United States Patent
Pujol et al.

(10) Patent No.: US 10,315,681 B2
(45) Date of Patent: Jun. 11, 2019

(54) COMPACT FOLDING BABY STROLLER

(71) Applicant: BABY JOGGER, LLC, Richmond, VA (US)

(72) Inventors: Jordi Dorca Pujol, Sant Joan de les Abadesses (ES); Zuan Zeng, Guangdong (CN); Matthew Luis Rivera, Roswell, GA (US)

(73) Assignee: BABY JOGGER, LLC, Atlanta, GA (US)

( * ) Notice: Subject to any disclaimer, the term of this patent is extended or adjusted under 35 U.S.C. 154(b) by 0 days.

(21) Appl. No.: 15/424,518

(22) Filed: Feb. 3, 2017

(65) Prior Publication Data

US 2017/0144686 A1 May 25, 2017

Related U.S. Application Data

(63) Continuation-in-part of application No. 15/215,240, filed on Jul. 20, 2016, now abandoned.
(Continued)

(51) Int. Cl.
*B62B 7/06* (2006.01)
*B62B 7/14* (2006.01)
(Continued)

(52) U.S. Cl.
CPC ............ *B62B 7/06* (2013.01); *B62B 7/062* (2013.01); *B62B 7/08* (2013.01); *B62B 7/145* (2013.01); *B62B 9/12* (2013.01); *B62B 9/20* (2013.01); *B62B 5/067* (2013.01); *B62B 7/064* (2013.01); *B62B 2205/20* (2013.01); *B62B 2205/22* (2013.01)

(58) Field of Classification Search
CPC ................................ B62B 7/14; B62B 7/142
USPC .................................. 280/647, 648, 642, 650
See application file for complete search history.

(56) References Cited

U.S. PATENT DOCUMENTS 5,201,535 A * 4/1993 Kato ...................... B62B 7/123
280/30
6,086,086 A * 7/2000 Hanson .................... A61G 5/00
280/642
(Continued)

FOREIGN PATENT DOCUMENTS

CN        101898574 A       12/2010
CN        204432722 U        7/2015
(Continued)

*Primary Examiner* — Jeffrey J Restifo
(74) *Attorney, Agent, or Firm* — Eversheds Sutherland (US) LLP

(57) ABSTRACT

The stroller can be folded into a more compact space. The stroller can include a pair of handle frames that include an upper handle frame, a lower handle frame, and a handle frame folding mechanism. The stroller can also include at least one rear wheel frame, at least one front wheel frame, a first frame folding mechanism rotatably connecting the front wheel frame, the rear wheel frame and one of the lower handle frames, and a second frame folding mechanism rotatably connecting the front wheel frame, the rear wheel frame, and the other of the lower handle frames. A seat can be attached to the stroller frame in a forward or rearward facing configuration. The stroller can be compactly folded with the seat still attached to the stroller frame in both the forward and rearward facing configurations.

20 Claims, 31 Drawing Sheets

Related U.S. Application Data

(60) Provisional application No. 62/194,350, filed on Jul. 20, 2015.

(51) Int. Cl.
    *B62B 9/20*     (2006.01)
    *B62B 7/08*     (2006.01)
    *B62B 9/12*     (2006.01)
    *B62B 5/06*     (2006.01)

(56) References Cited

U.S. PATENT DOCUMENTS

| | | | | |
|---|---|---|---|---|
| 7,377,537 B2 * | 5/2008 | Li | B62B 7/123 | 280/47.38 |
| 7,584,985 B2 * | 9/2009 | You | B62B 7/06 | 280/47.38 |
| 7,681,894 B2 * | 3/2010 | Santamaria | B62B 7/142 | 24/589.1 |
| 7,686,323 B2 * | 3/2010 | Chen | B62B 7/142 | 280/47.38 |
| 7,766,366 B2 * | 8/2010 | Li | B62B 7/08 | 280/642 |
| 7,789,402 B2 * | 9/2010 | Saville | B62B 7/123 | 280/47.38 |
| 7,798,500 B2 * | 9/2010 | Den Boer | B62B 7/062 | 280/47.34 |
| 8,087,689 B2 * | 1/2012 | Fritz | B62B 7/062 | 280/647 |
| 8,205,907 B2 * | 6/2012 | Chicca | B62B 7/062 | 280/642 |
| 8,596,669 B2 * | 12/2013 | Liao | B62B 7/08 | 280/47.38 |
| 8,651,502 B2 * | 2/2014 | Winterhalter | B60N 2/2848 | 280/47.4 |
| 8,657,326 B2 * | 2/2014 | Shaanan | B62B 7/142 | 280/47.38 |
| 8,672,341 B2 * | 3/2014 | Offord | B62B 7/062 | 280/47.38 |
| 8,714,581 B2 * | 5/2014 | Fritz | B62B 7/08 | 280/642 |
| 8,733,784 B2 * | 5/2014 | Kobayashi | B62B 7/062 | 280/647 |
| 8,851,505 B2 * | 10/2014 | Van Gelderen | B62B 7/145 | 280/657 |
| 8,870,213 B1 | 10/2014 | Xu | | |
| 8,979,114 B2 * | 3/2015 | Cheng | B62B 7/062 | 280/642 |
| 8,985,616 B1 * | 3/2015 | Chen | B62B 7/062 | 280/47.38 |
| 9,027,952 B2 * | 5/2015 | Zhu | B62B 7/142 | 280/30 |
| 9,221,487 B2 * | 12/2015 | Doucette | B62B 7/00 | |
| 9,260,128 B2 * | 2/2016 | Liu | B62B 7/08 | |
| 9,399,477 B2 * | 7/2016 | Iftinca | B62B 7/06 | |
| 9,428,208 B1 * | 8/2016 | Chen | B62B 9/18 | |
| 9,545,940 B2 * | 1/2017 | Taylor | B62B 7/142 | |
| 9,610,966 B2 * | 4/2017 | Zhong | B62B 7/142 | |
| 9,776,652 B2 * | 10/2017 | Zhong | B62B 7/008 | |
| 9,796,404 B2 | 10/2017 | Xu | | |
| 9,849,903 B1 * | 12/2017 | Lai | B62B 9/12 | |
| 2008/0231023 A1 * | 9/2008 | Yang | B62B 9/102 | 280/650 |

FOREIGN PATENT DOCUMENTS

| | | |
|---|---|---|
| CN | 104828120 A | 8/2015 |
| CN | 205311677 U | 6/2016 |
| CN | 107082083 A | 8/2017 |
| CN | 107128350 A | 9/2017 |
| DE | 202015102869 U1 | 6/2015 |
| JP | 3170838 U | 9/2011 |

\* cited by examiner

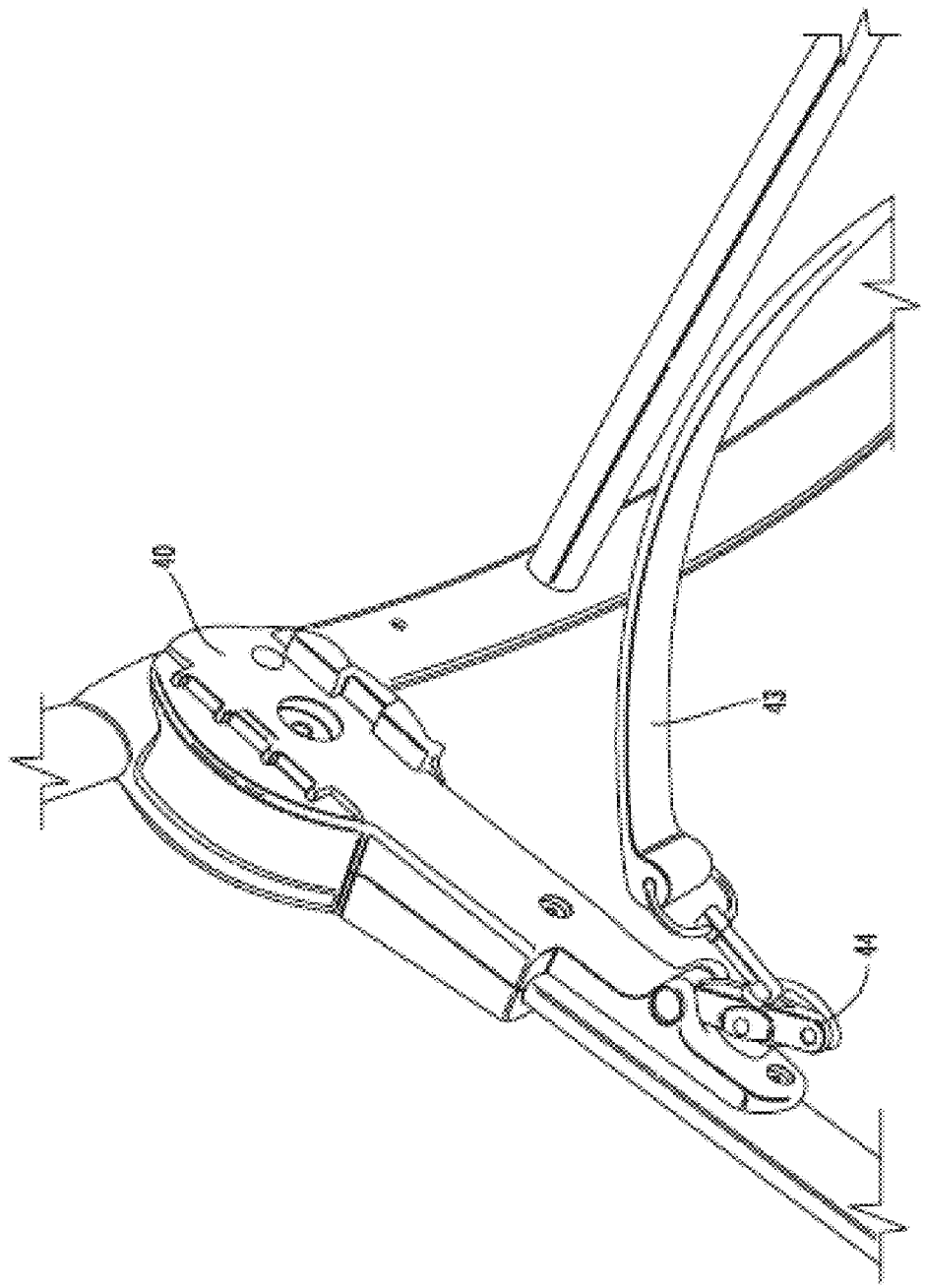

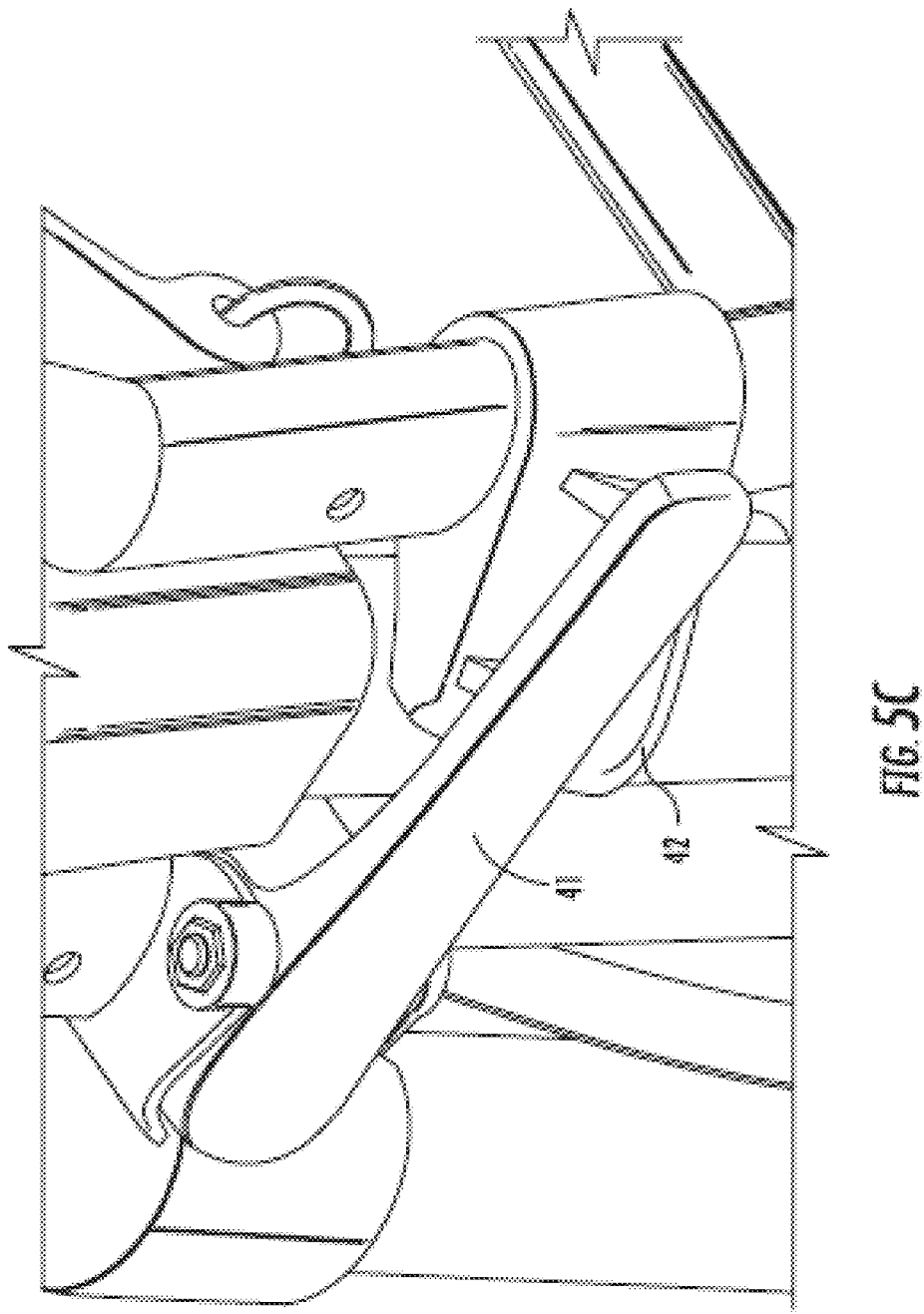

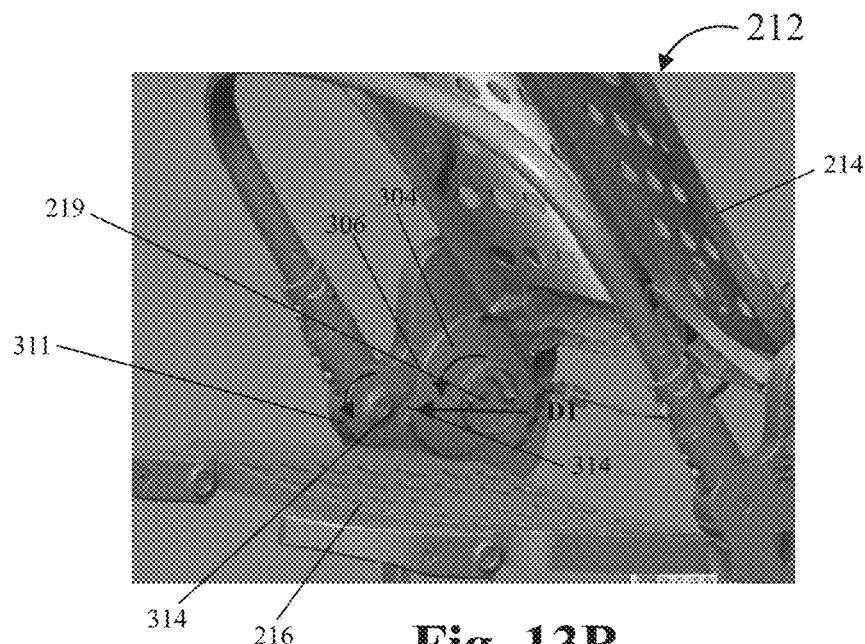
Fig. 13B
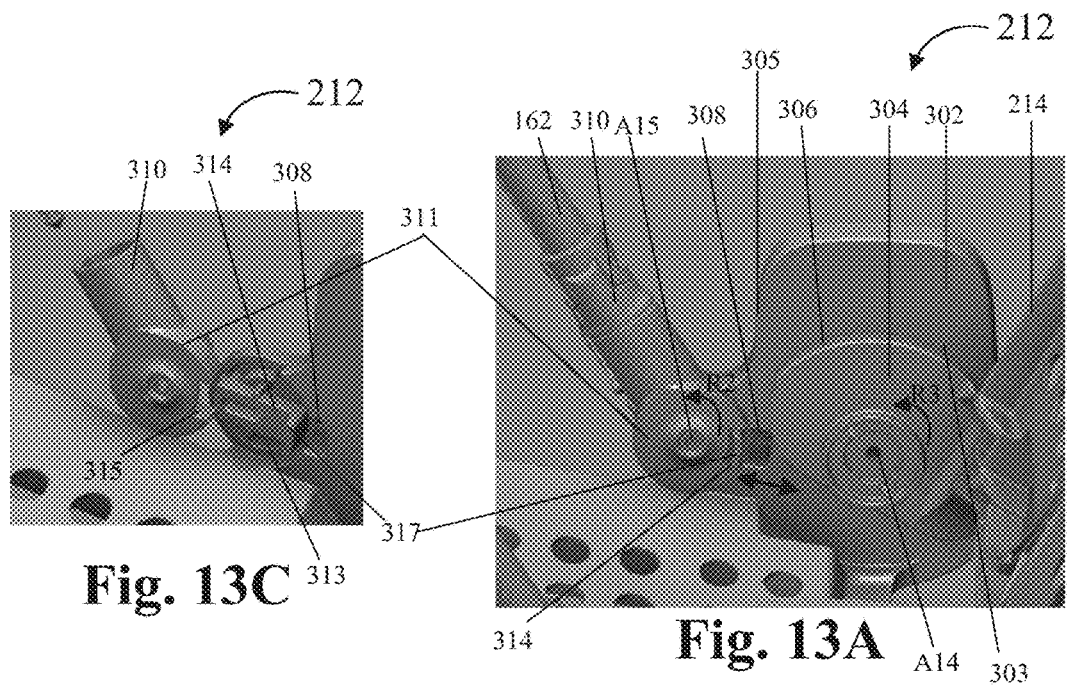
Fig. 13C
Fig. 13A

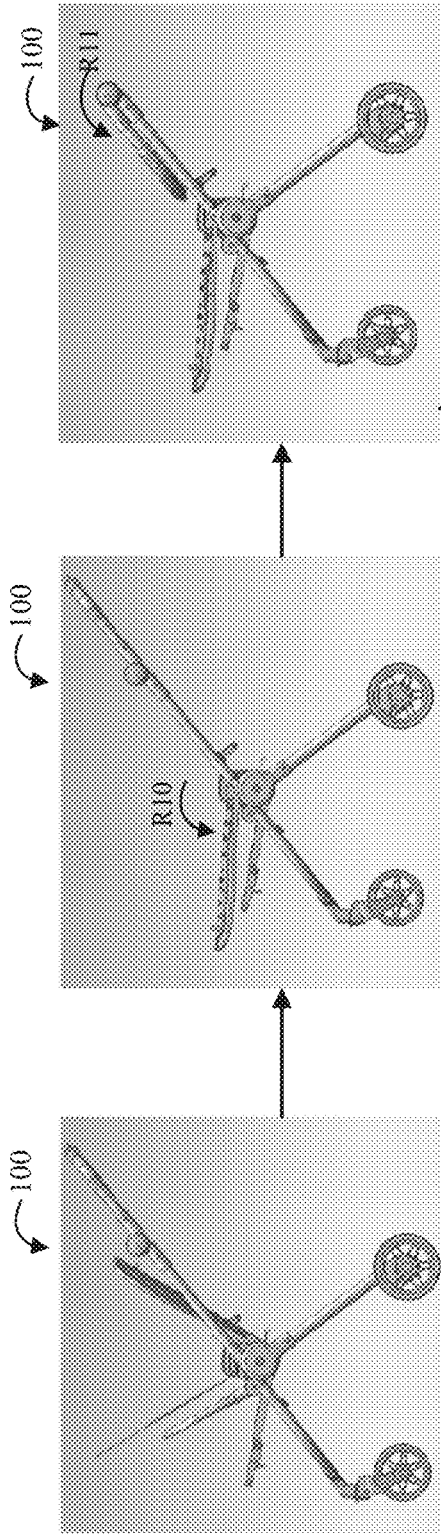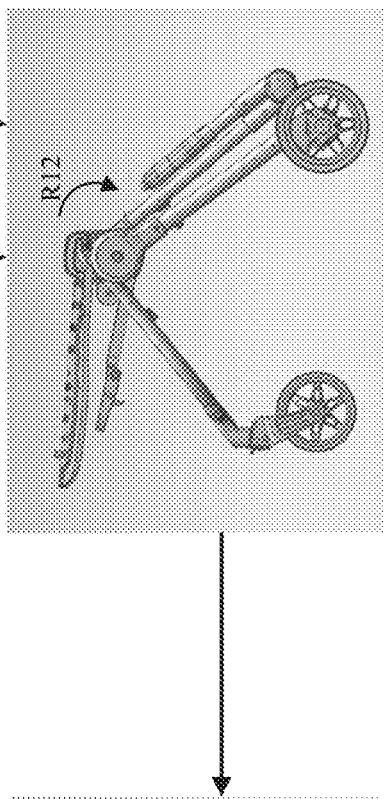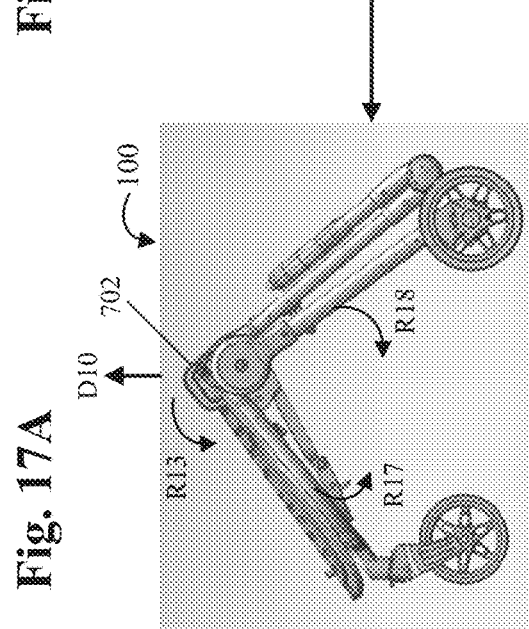
Fig. 17A  Fig. 17B  Fig. 17C  Fig. 17D  Fig. 17E

COMPACT FOLDING BABY STROLLER

CROSS-REFERENCE TO RELATED APPLICATION

This application is a continuation-in-part of and claims priority under 35 U.S.C. § 120 to U.S. patent application Ser. No. 15/215,240, filed on Jul. 20, 2016 and titled Compact Folding Baby Stroller, which claims priority to U.S. Provisional Patent Application No. 62/194,350 filed Jul. 20, 2015, and titled "Baby Stroller," the entire contents of each of which are hereby incorporated herein by reference for all purposes.

TECHNICAL FIELD

The present disclosure relates generally to infant and toddler strollers and move particularly to a compact folding infant and toddler stroller.

BACKGROUND

Many conventional baby strollers have a frame with one folding mechanism on each side that allows the baby stroller to be converted from an unfolded in-use position to a folded position that has a reduced volume for ease of storage or transportation. In a conventional stroller, the three main frame members, front wheel frame, rear wheel frame and handle frame are approximately the same length so that when the stroller is folded the frame members are approximately aligned. In such cases, the size of the folded stroller is limited to the length of the longest frame member. As such, the size (which refers to the volume of the stroller in the folded position) may still take up more storage space (or be longer than desired) and a larger size or volume may result in inconvenience during transportation or carrying of the baby stroller.

BRIEF DESCRIPTION OF THE EXAMPLE DRAWINGS

Reference will now be made to the accompanying drawings, which are not necessarily drawn to scale.

FIGS. 1A-E are various views of a stroller frame in the unfolded, in-use configuration according to one example embodiment of the disclosure.

FIG. 4 is a partial perspective view of a frame folding mechanism of the stroller frame of FIGS. 1A-E and 6A-B according to one example embodiment of the disclosure.

Figure 5A:
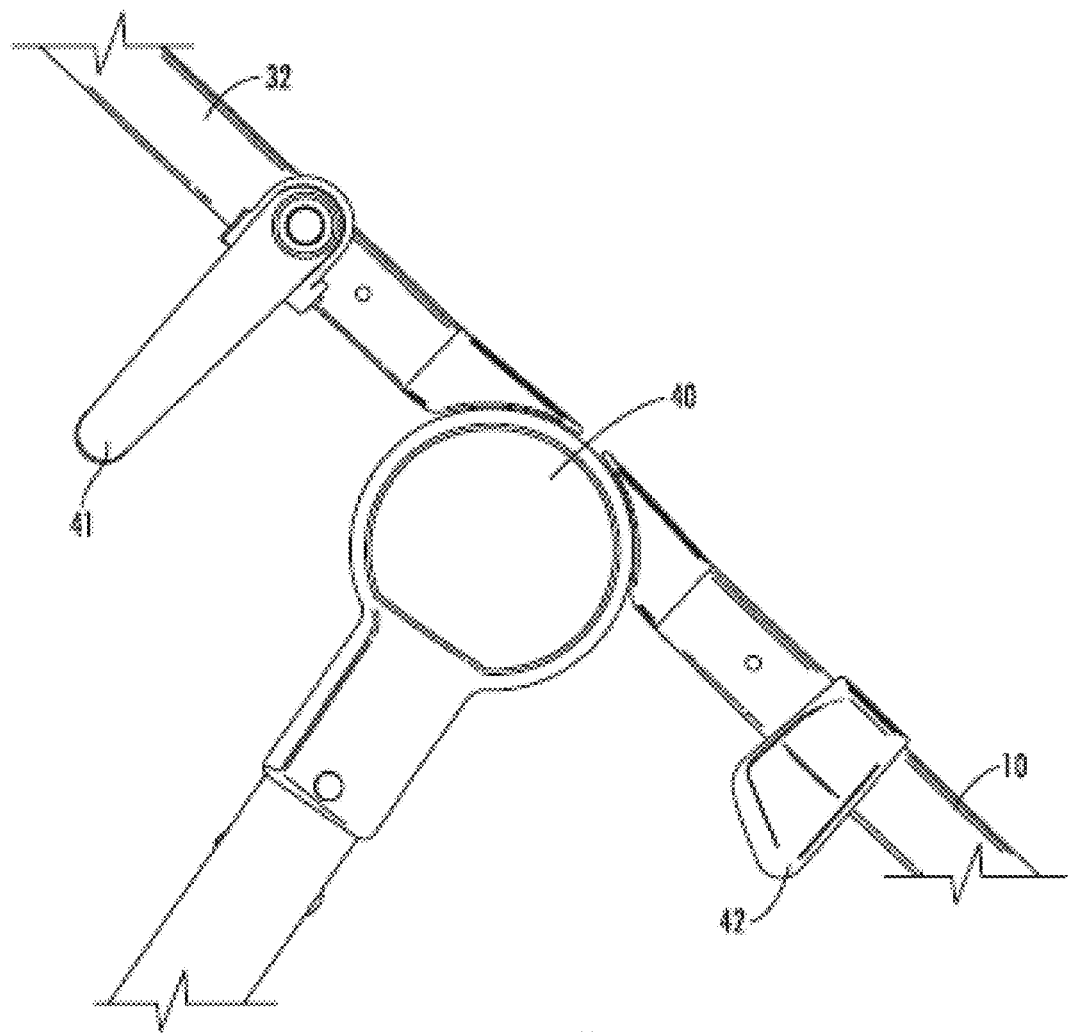
Figure 5B:
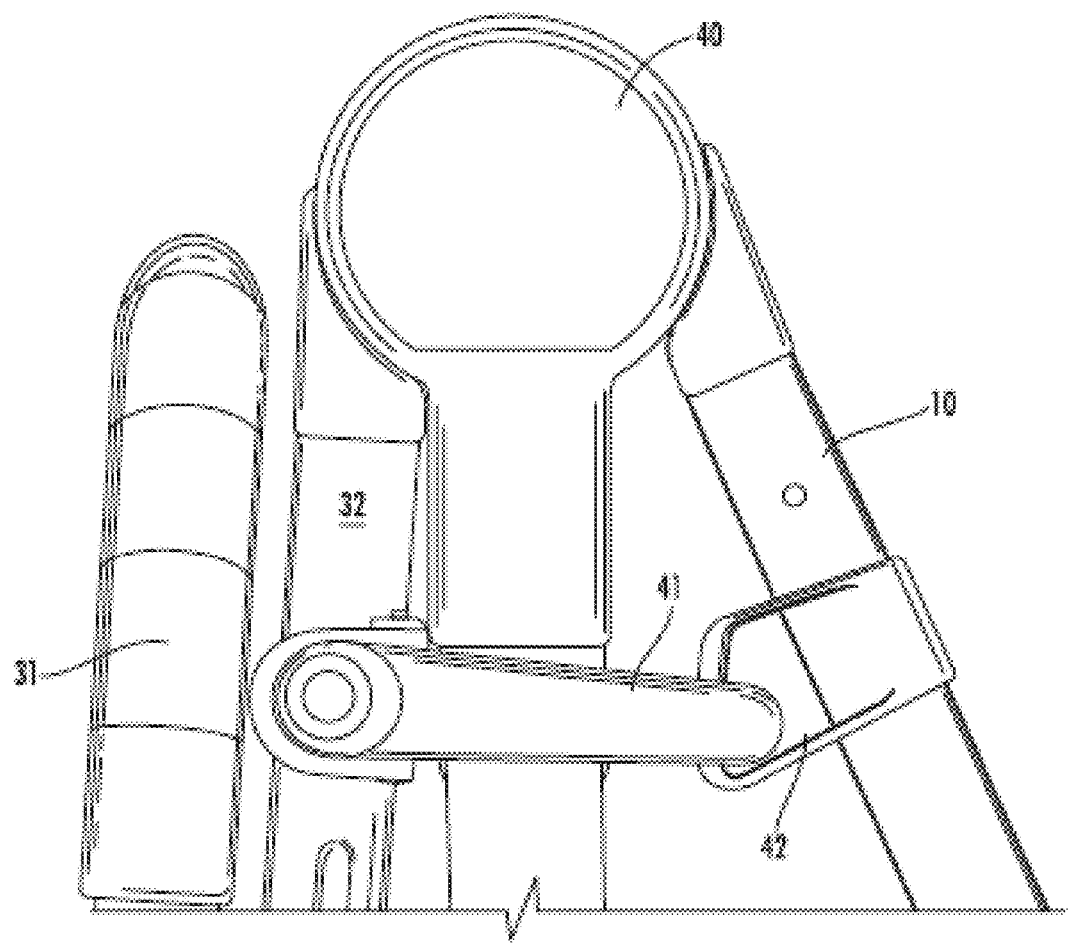

FIG. 5A-C are various engaged and disengaged views of a frame lock latch and a frame lock latch receiver of the stroller of FIG. 1 according to one example embodiment of the disclosure.

Figure 6A:
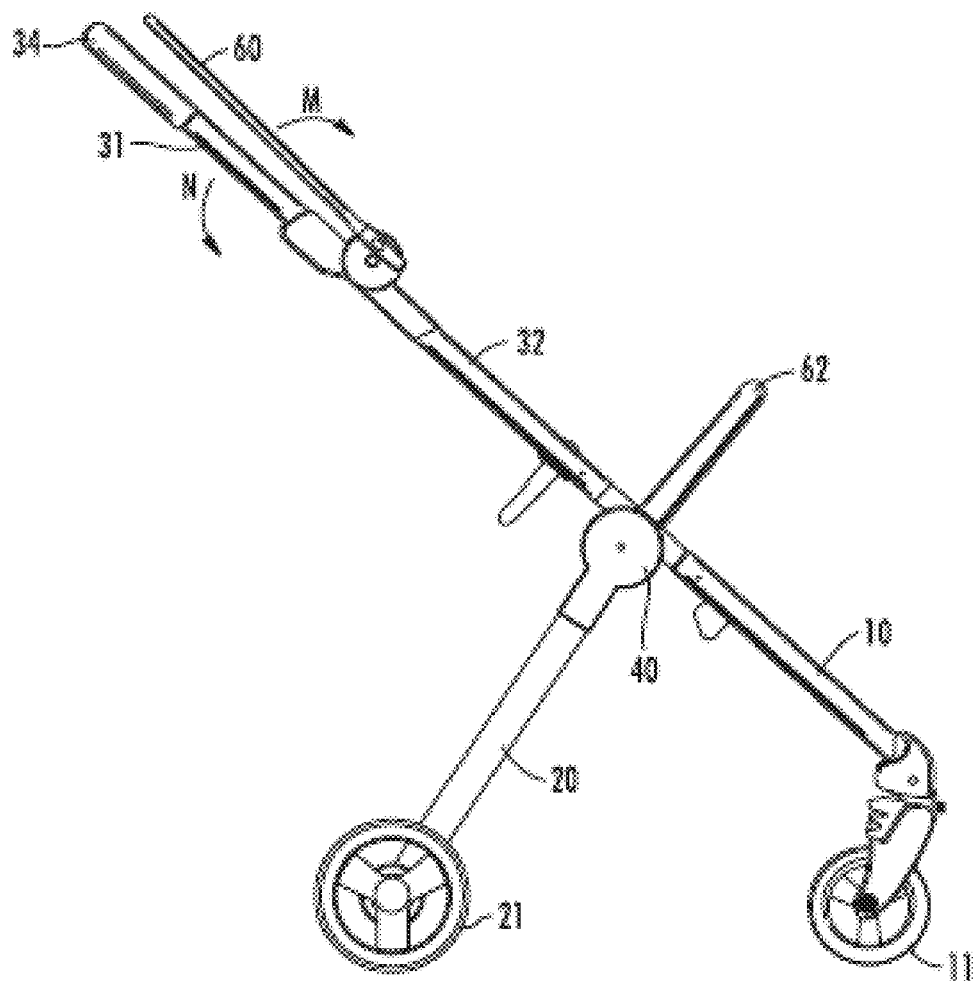
Figure 6B:
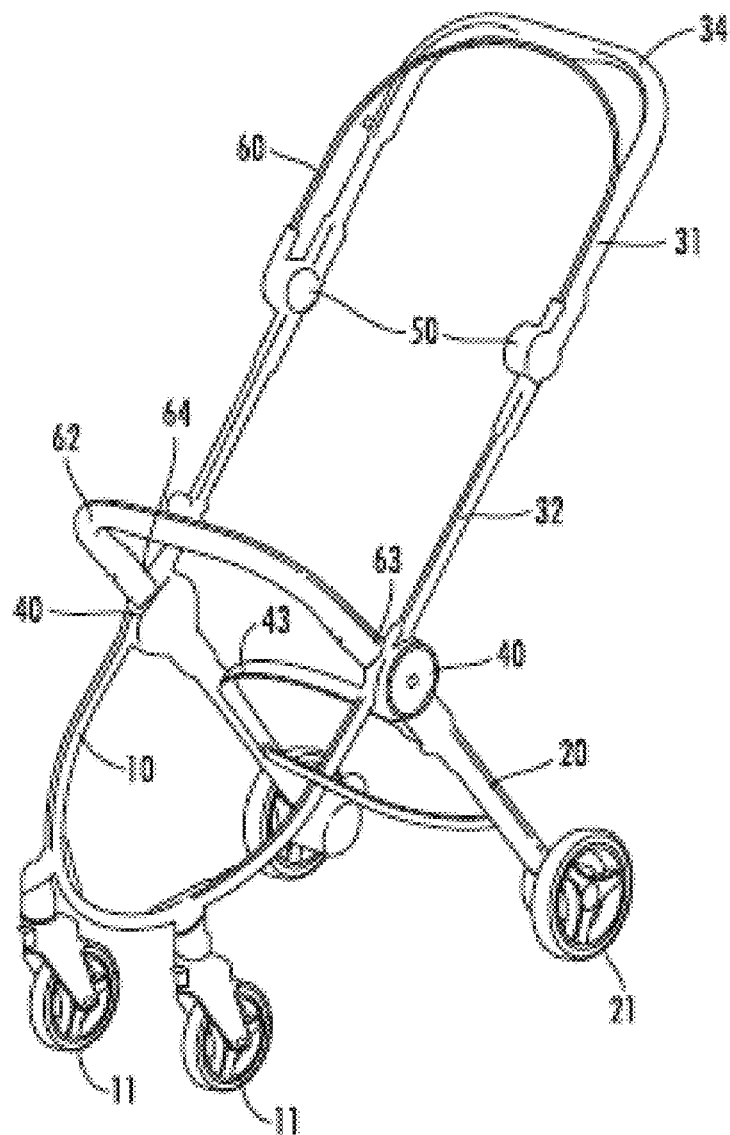

FIGS. 6A-B are side and perspective views of the stroller of FIG. 1 with an optional belly bar in the unfolded, in-use configuration according to one example embodiment of the disclosure.

Figure 7A:
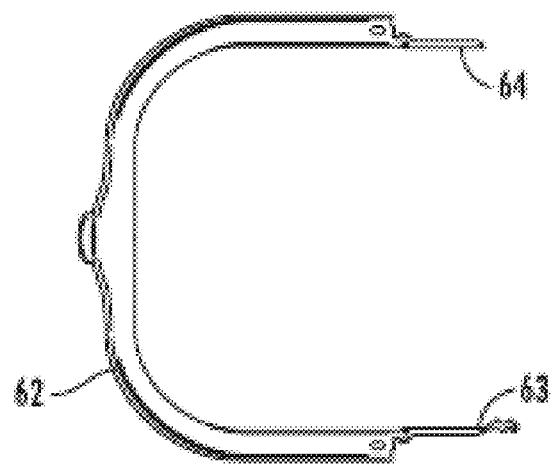
Figure 7B:
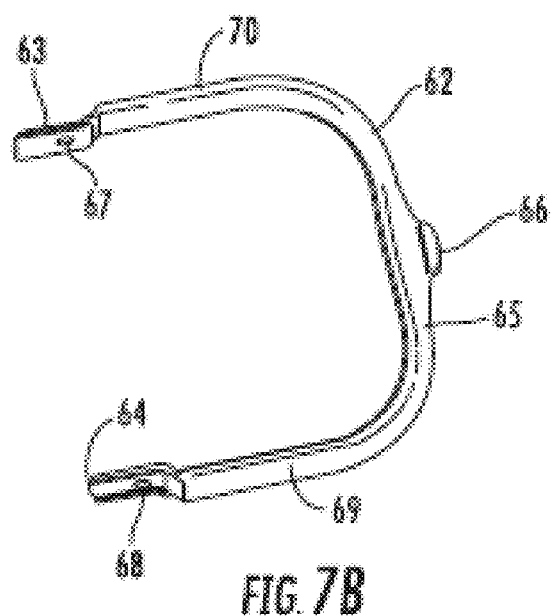

FIGS. 7A-B are top and perspective views of the belly bar on the stroller of FIGS. 6A-B according to one example embodiment of the disclosure.

Figure 8:
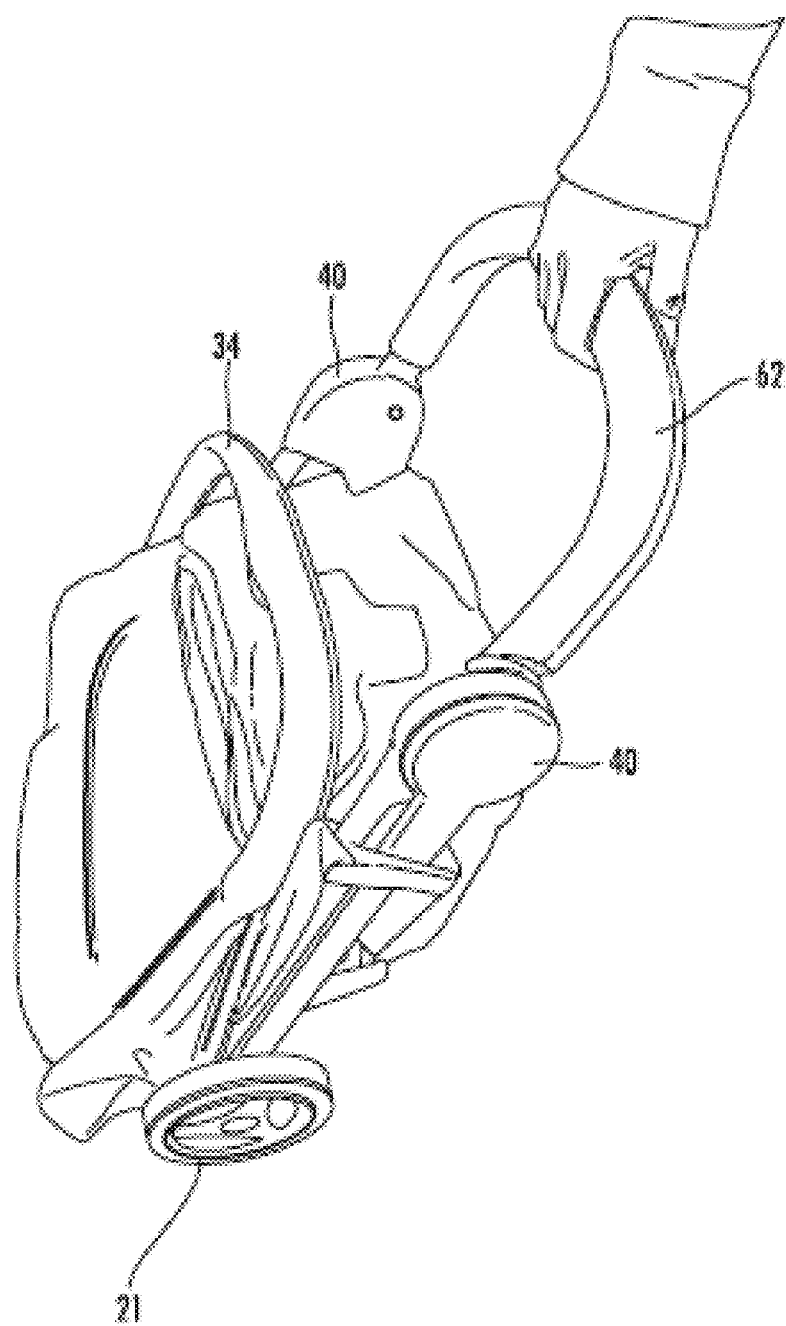

FIG. 8 is a perspective view of the stroller of FIGS. 6A-B with belly bar in the folded, storage configuration according to one example embodiment of the disclosure.

Figure 9:
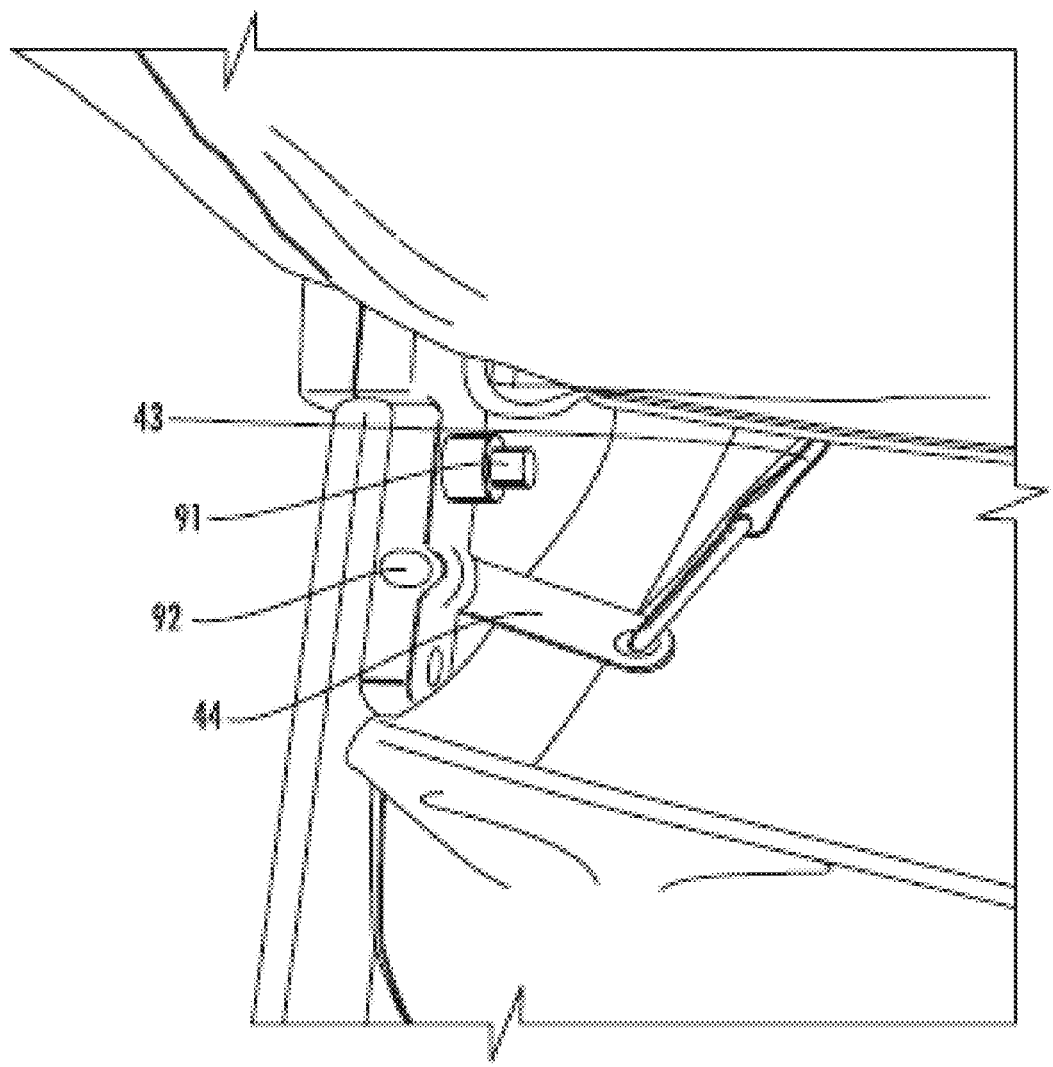

FIG. 9 is a partial view of a secondary release mechanism for the frame folding mechanism of FIGS. 1A-E and 6A-B according to one example embodiment of the disclosure.

Figure 10:
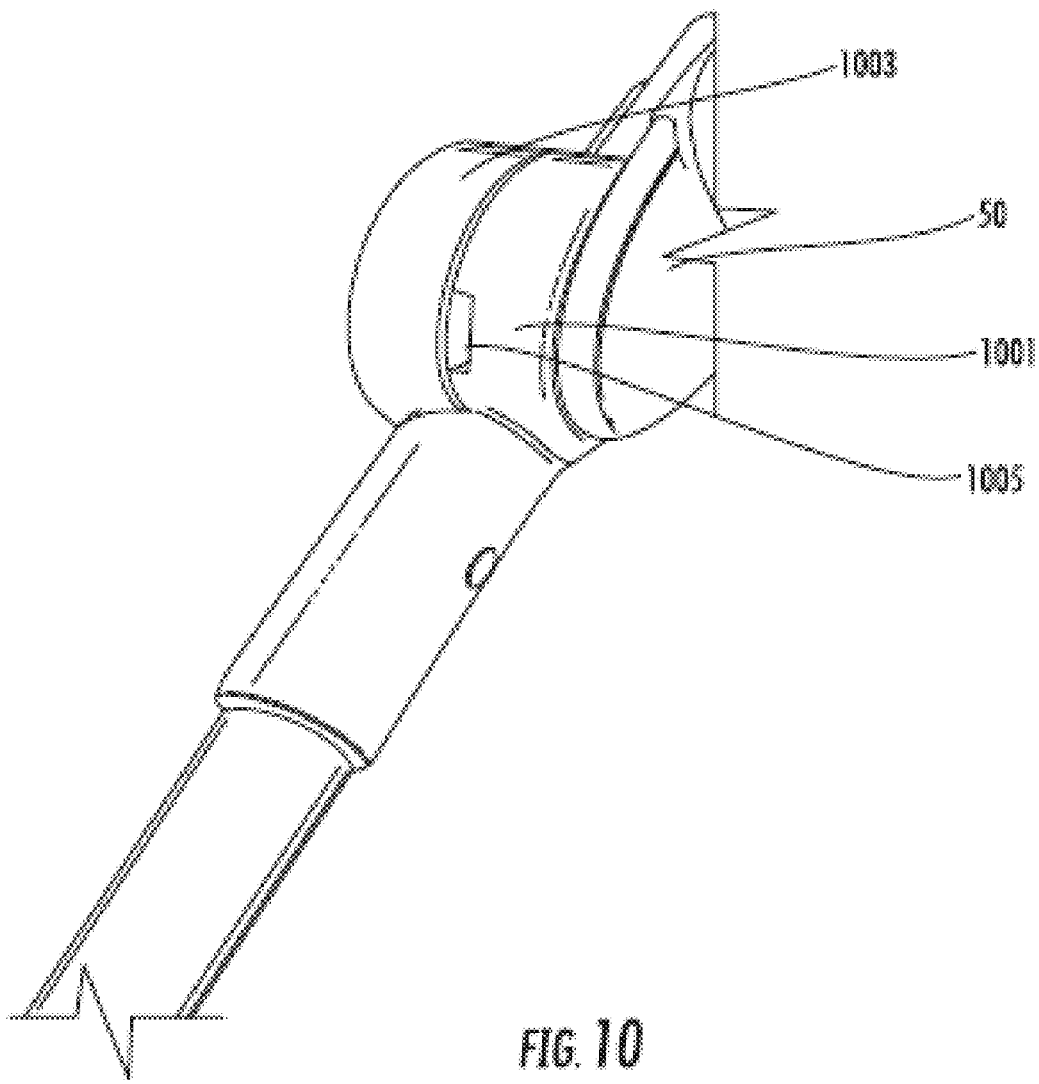

FIG. 10 is a partial perspective view of an optional modification presented on one of the handle frame folding mechanisms of the folding stroller frame of FIGS. 1A-E and 6A-B according to one example embodiment of the disclosure.

FIGS. 11A-D are various views of another stroller frame in the unfolded, in use configuration, and certain elements of the stroller frame according to one example embodiment of the disclosure.

FIGS. 12A-D are various views of a detachable, reversible seat that can be attached to the stroller frame of FIGS. 11A-D in either a forward-facing or rearward-facing configuration according to one example embodiment of the disclosure.

FIGS. 13A-C are various partial views of the rotation hubs for the reversible seat and belly bar according to one example embodiment of the disclosure.

Figure 14:
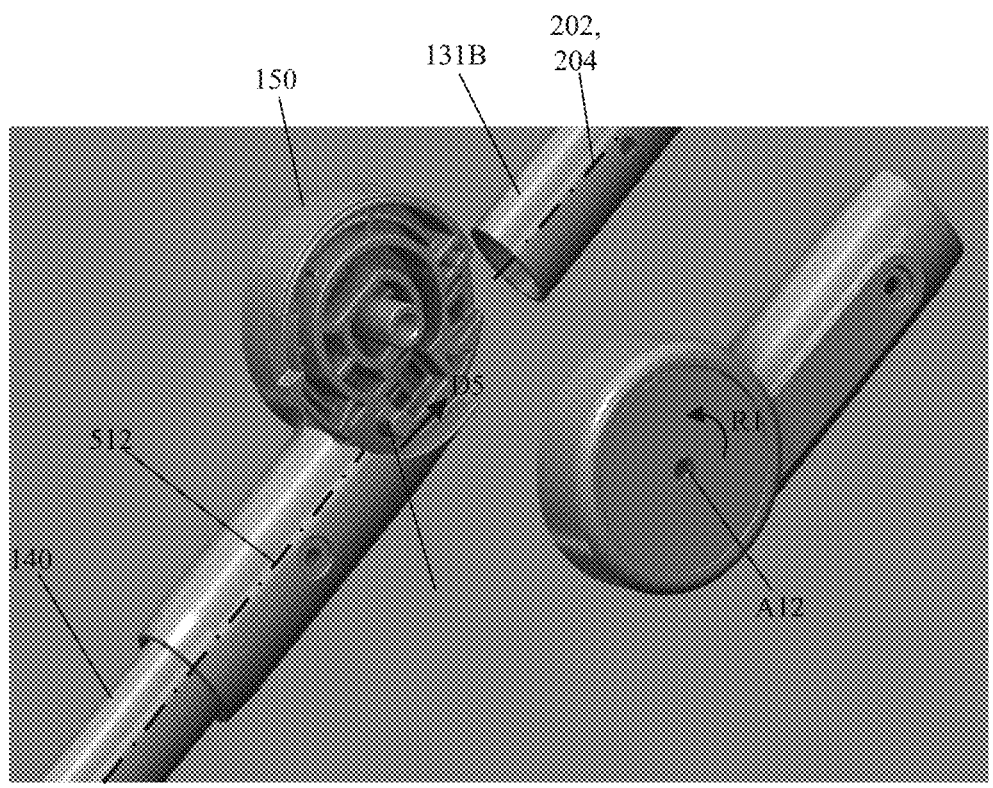

FIG. 14 is a partial-exploded view of the rotation hub for handle frame of the stroller frame of FIGS. 11A-D according to one example embodiment of the disclosure.

Figure 15A:
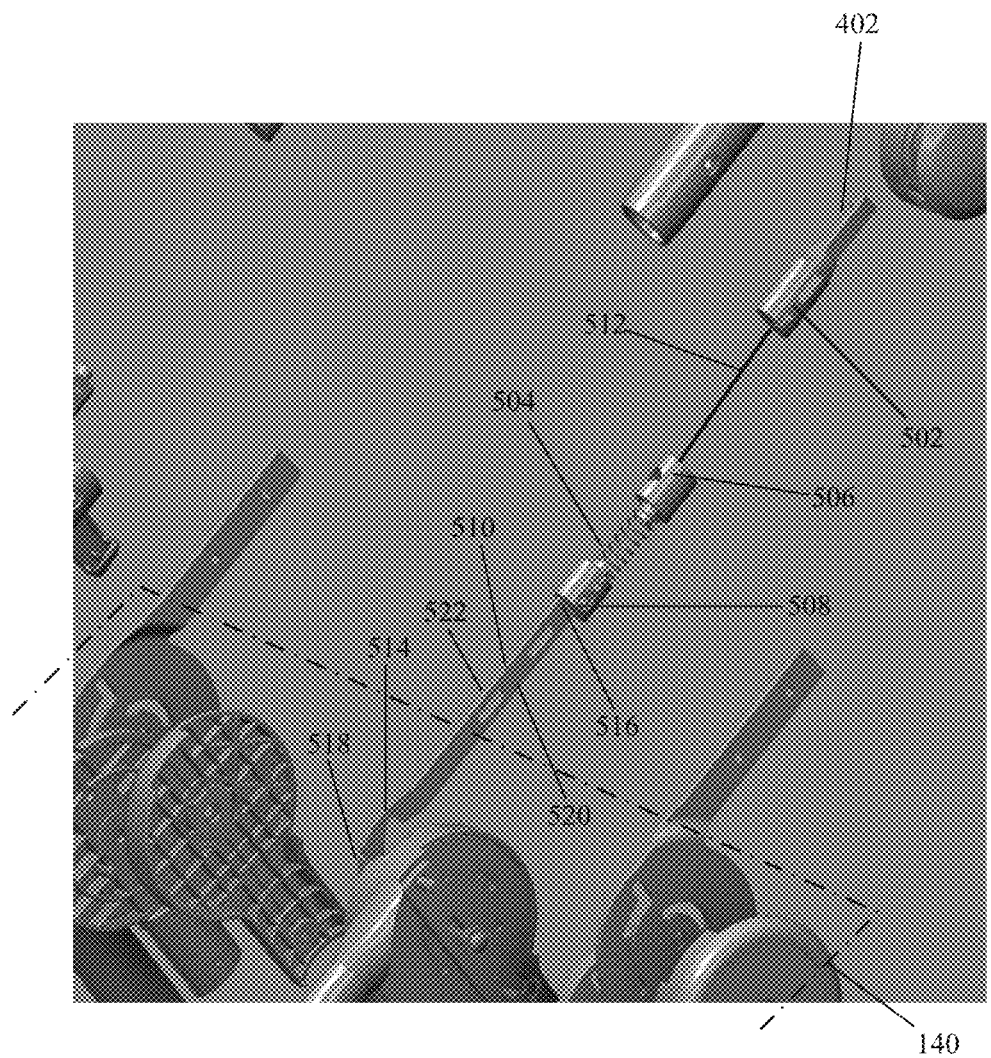
Figure 15B:
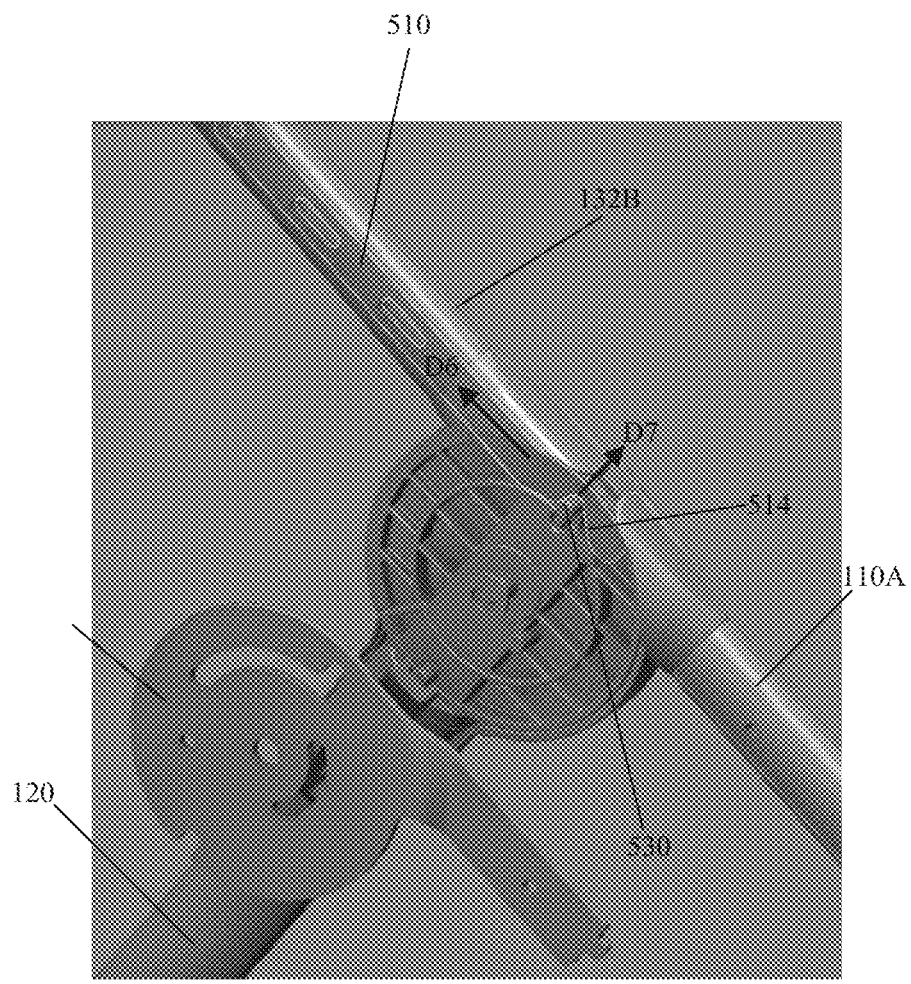

FIGS. 15A-B are partial-exploded views of the frame folding release mechanism and frame folding mechanism to fold the stroller frame of FIGS. 11A-D according to one example embodiment of the disclosure.

Figure 16A:
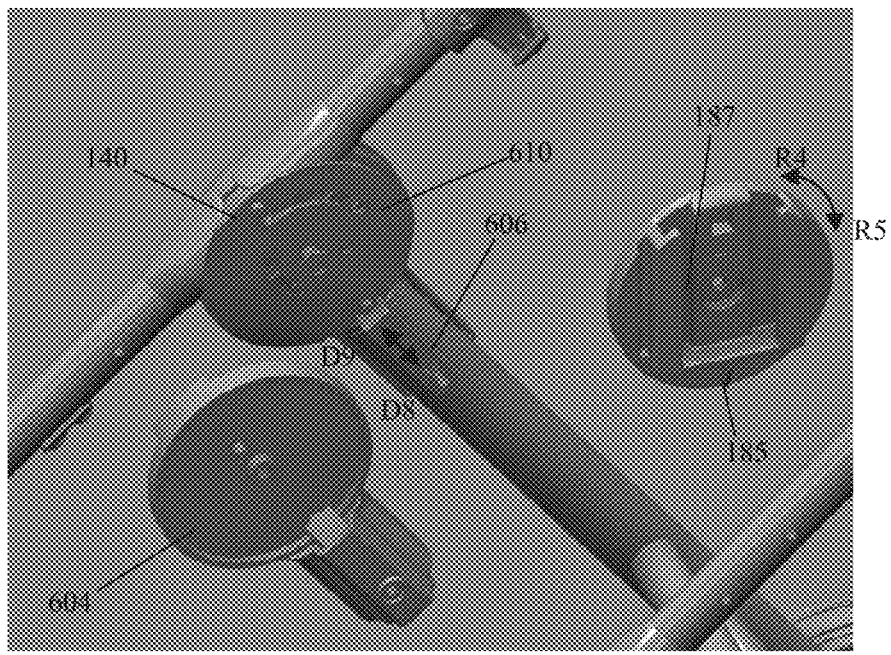
Figure 16B:
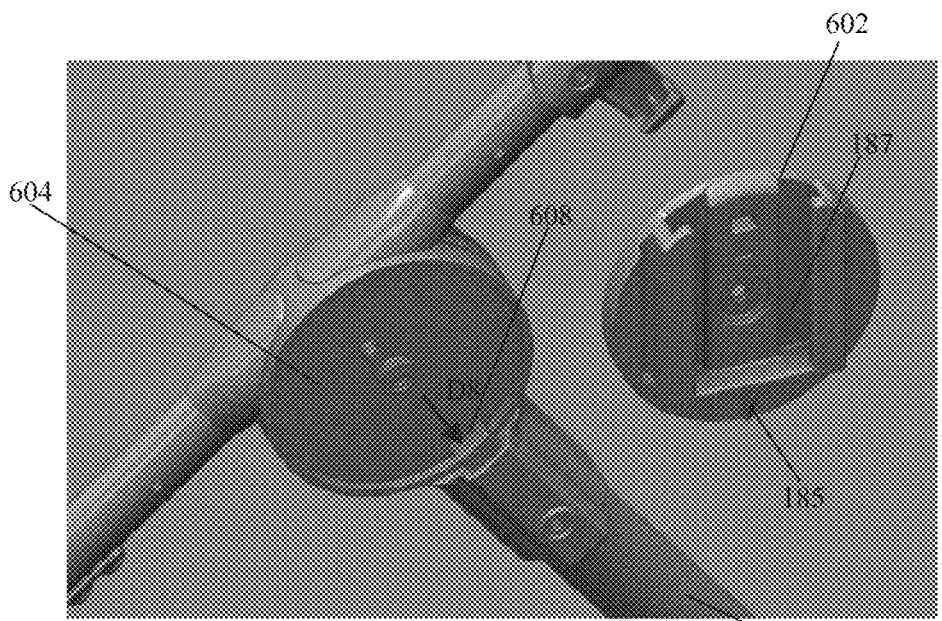

FIGS. 16A-B are partial-exploded views of the seat attachment mechanism for the stroller frame 100 of FIGS. 11A-D according to one example embodiment of the disclosure.

FIGS. 17A-E are a pictorial representation of a method for folding the stroller frame of FIGS. 11A-16B with the seat attached in a forward facing configuration according to one example embodiment of the disclosure.

FIGS. 18A-D are a pictorial representation of another method for folding the stroller frame of FIGS. 11A-16B with the seat attached in a rear facing configuration according to one example embodiment of the disclosure.

Figure 19:
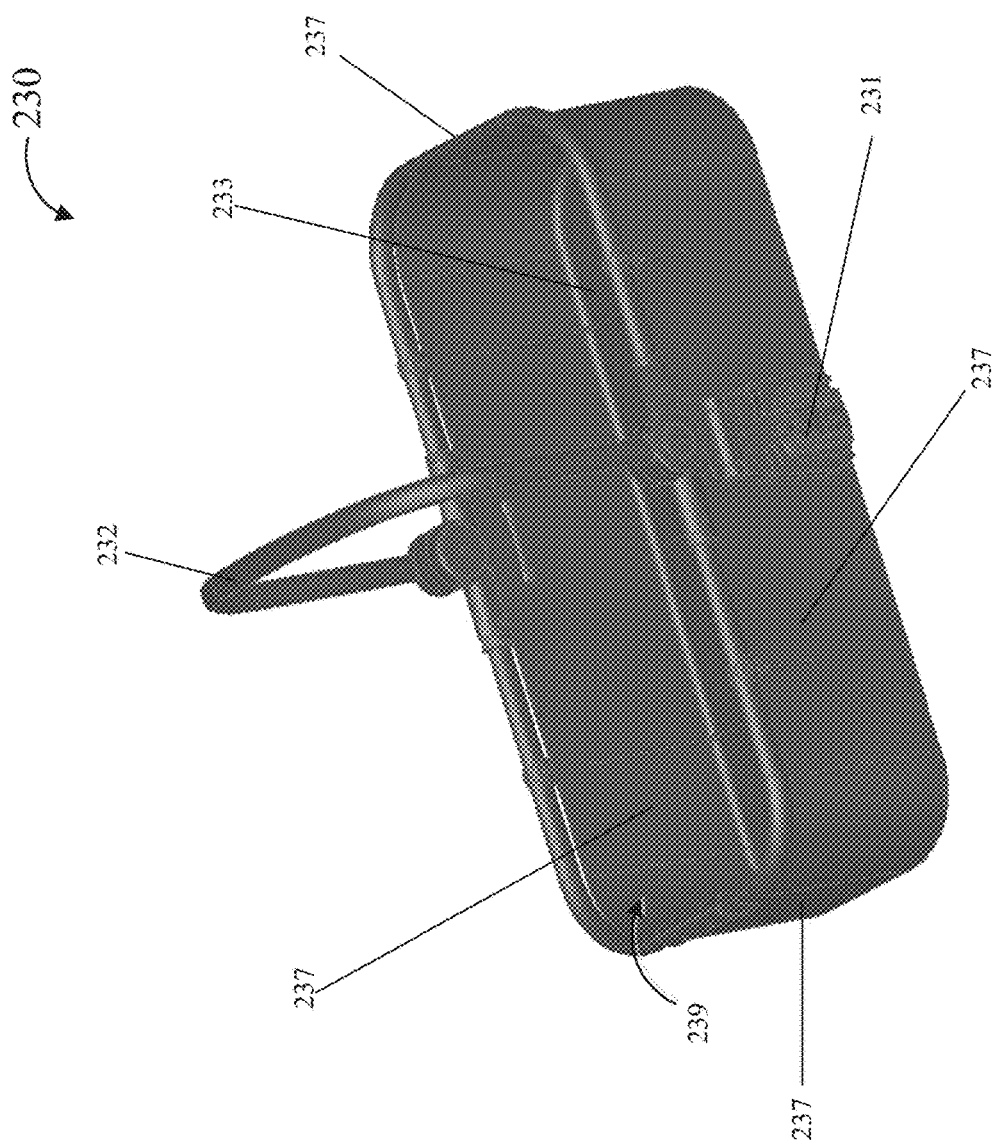

FIG. 19 is a perspective view of a carry-cot that can be attached to the stroller frame of FIGS. 11A-D according to one example embodiment of the disclosure.

DETAILED DESCRIPTION OF EXAMPLE EMBODIMENTS

Example embodiments will now be described more fully hereinafter with reference to the accompanying drawings, in which example embodiments are shown. The concepts disclosed herein may, however, be embodied in many different forms and should not be construed as limited to the example embodiments set forth herein. Rather, these embodiments are provided so that this disclosure will be thorough and complete, and will fully convey the scope of the concepts to those skilled in the art. Like numbers refer to like, but not necessarily the same or identical, elements throughout.

Certain dimensions and features of the example foldable stroller are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the example foldable stroller and between features of the example foldable stroller are described herein using the terms "substantially" and "substantially equal." As used herein, the terms "substantially" and "substantially equal" indicate that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the terms "substantially perpendicular" and "substantially orthogonal" indicate that the perpendicular relationship is not a strict relationship and does not exclude functionally similar variations therefrom.

FIGS. 1A-E are various views of a foldable stroller frame 1 in the unfolded, in-use configuration according to one example embodiment of the disclosure. Now referring to FIGS. 1A-E, the example foldable stroller frame 1 can include a pair of handle frames 30, each disposed on corresponding left and right sides of the stroller frame 1. Each handle frame 30 can be constructed of a solid core or tubing material made of metal or plastic. Each handle frame 30 can include a pair (e.g., left and right side) of upper handle frames 31 and a corresponding pair (e.g., left and right side) of lower handle frames 32. Each of the upper handle frames 31 can extend from a corresponding first end 31A to a corresponding distal second end 31B and define a linear distance for each of the upper handle frames 31. Each of the lower handle frames 32 can extend from a first end 32A to a distal second end 32B and define a second linear distance for each of the lower handle frames 32. In certain example embodiments, the foldable stroller frame 1 further includes a handle grip portion 34 that extends between the corresponding first ends 31A of each of the upper handle frames 31 and couple the upper handle frames 31 together. In certain example embodiments, each of the upper handle frames 31 and the handle grip portion 34 are made of separate pieces of solid core or tubing material made of metal or plastic. Alternatively, each of the upper handle frames 31 and the handle grip portion 34 can be integrally formed from a single unitary piece of material.

Each of the upper handle frames 31 can be rotatably coupled to the lower handle frame 32. In one example embodiment, each of the second ends 31B of the upper handle frames 31 is coupled to a corresponding handle frame folding mechanism 50. Further, each of the first ends 32A of the lower handle frame 32 are coupled to the corresponding handle frame folding mechanism 50 to rotatably couple the lower handle frame 32 to the upper handle frame 31 on each of the left and right sides of the stroller frame 1. In certain example embodiments, the handle frame folding mechanism 50 may be disposed substantially in a central portion of the handle frame 30. For example, the upper handle frame 31 and the lower handle frame 32 may be substantially the same length from the pivot axis A2 of the handle folding mechanism 50 (as shown in FIG. 1C). The upper handle frame 31 and the lower handle frame 32 can be substantially linear in one of the unfolded configurations and substantially parallel in the folded configuration, such as in a standard butt hinge. Alternatively, either the upper handle frame 31 or the lower handle frame 32 may have a smaller length or width such that one frame 31 or 32 may be folded to be within the other frame.

In certain example embodiments, the handle frame folding mechanism 50 can include a mechanism to lock the handle frame 30 in at least an unfolded configuration. Further, in this or other example embodiments, the handle frame folding mechanism 50 may be able to be locked in the folded storage position and in a plurality of handle height adjustment positions. In another example embodiment, the handle frame 30 can include two folding mechanisms on each side of the stroller frame 1, one for folding the handle frame 30 (e.g., folding the lower handle frame 32 and the upper handle frame 31) in half and the other for adjusting the height of the handle grip 34. In still another example embodiment, the handle frame 30 can include two handle frame folding mechanisms and three handle frame members on each of the left and right sides of the stroller frame 1 to reduce the handle frame to one third the length of the handle frame 30 in the folded, storage configuration.

In an alternate example embodiment, the handle frame folding mechanisms can be eliminated and replaced with a telescoping handle frame that includes the lower handle frame portion and the upper handle frame portion. In this alternate embodiment, the upper handle frame portion can be adjusted between a retracted position, where a substantial portion (e.g., more than 50% and preferably more than 70% and more preferably more than 90% of the longitudinal length (e.g., from the first end 31A to the second end 31B) can be received within a hollow interior of each of the lower handle frames 32, and an extended position substantially similar to that shown in FIG. 1A. Adjacent one or both of the second ends 31B, the upper handle frame 31 can include an adjustable latching mechanism that operatively couples to a corresponding latching mechanism positioned adjacent to the first end 32A of one or both of the lower handle frames. The handle folding mechanism latch 33 (FIG. 3) may then be operatively coupled to the adjustable latching mechanism (s) to release the latching mechanism when the user wants to move the upper handle frame 31 into the retracted position. The upper handle frames 31 may then be slidably received into the interior of the corresponding lower handle frames 32. While the alternative embodiment is described as having the upper handle frames 31 being slidably received into the lower handle frames 32, the operation can be reversed and the lower handle frames 32 can be slidably received into hollow interiors of the corresponding upper handle frames 32 such that the same substantial portions of the lower handle frames 32 are received within the upper handle frames 31. Further, while the example alternate embodiment is described with a single telescoping member, alternatively either the upper handle frames 31 or the lower handle frames 32 may be modified to have multiple members that telescope into one another in a similar manner to achieve the same reduction of the substantial portion of the upper handle frames 31 or lower handle frames 32 as described above.

The example folding stroller 1 can also include one or more front wheel frames 10 that extend from a pair of first ends 10A to a distal second end 10B. Each front wheel frame 10 can be constructed of a solid core or tubing material made of metal or plastic. In certain example embodiments, each of the first ends 10A of the front wheel frame 10 is rotatably coupled to the corresponding second ends 32B of the lower handle frames 32 via corresponding frame folding mechanisms 40 on each of the left and right sides of the stroller frame 1. One or more front wheels 11 can be coupled to the front wheel frame 10. In certain example embodiments, two front wheels 11 are provided. In another example embodiment, one front wheel 11 is provided on the stroller frame 1. Each front wheel 11 can rotate about a horizontal axis parallel or substantially parallel to the surface that the stroller frame 1 is disposed on. In certain example embodiments, each front wheel 11 can also rotate about a vertical axis that is orthogonal or substantially orthogonal to the surface that the stroller frame 1 is disposed on. In some example embodiments, the front wheels 11 may be rotatably or foldably connected to the front wheel frame 10 such that the wheels 11 may be rotated or folded to a position that reduces the size, length, or volume of the stroller frame 1 in its folded, storage configuration. In other example embodiments, the front wheels 11 may be removably coupled to the front wheel frame 10 such that the front wheels 11 may be removed from the front wheel frame 10 to reduce the size, length, or volume of the stroller frame 1 in its folded, storage configuration.

The example folding stroller 1 can also include one or more rear wheel frames 20 that extend from a pair of first ends 20A to a distal second end 20B. For example, as shown in FIG. 1D, the folding stroller frame 1 can include a pair of rear wheel frames 20, with each of the rear wheel frames 20 disposed on corresponding left and right sides of the stroller frame 1. Each rear wheel frame 20 can be constructed of a solid core or tubing material made of metal or plastic. In certain example embodiments, each of the first ends 20A of the rear wheel frame 20 is rotatably coupled to the corresponding second ends 32B of the lower handle frames 32 and the corresponding first ends 10A of the front wheel frame 10 via corresponding frame folding mechanisms 40 on each of the left and right sides of the stroller frame 1. One or more rear wheels 11 can be coupled to each rear wheel frame 20. In certain example embodiments, two rear wheels 21 are provided, one on each rear wheel frame 20; however, greater or fewer numbers of wheels are contemplated within this disclosure. Each rear wheel 21 can rotate about a horizontal axis parallel or substantially parallel to the surface that the stroller frame 1 is disposed on. In some example embodiments, the rear wheels 21 may be rotatably or foldably connected to the rear wheel frame 20 such that the rear wheels 21 may be rotated or folded to a position that reduces the size, length, or volume of the stroller frame 1 in its folded, storage configuration. In other example embodiments, the rear wheels 21 may be removably coupled to the rear wheel frame 20 such that the rear wheels 11 may be removed from the rear wheel frame 20 to reduce the size, length, or volume of the stroller frame 1 in its folded, storage configuration.

Figure 1A:
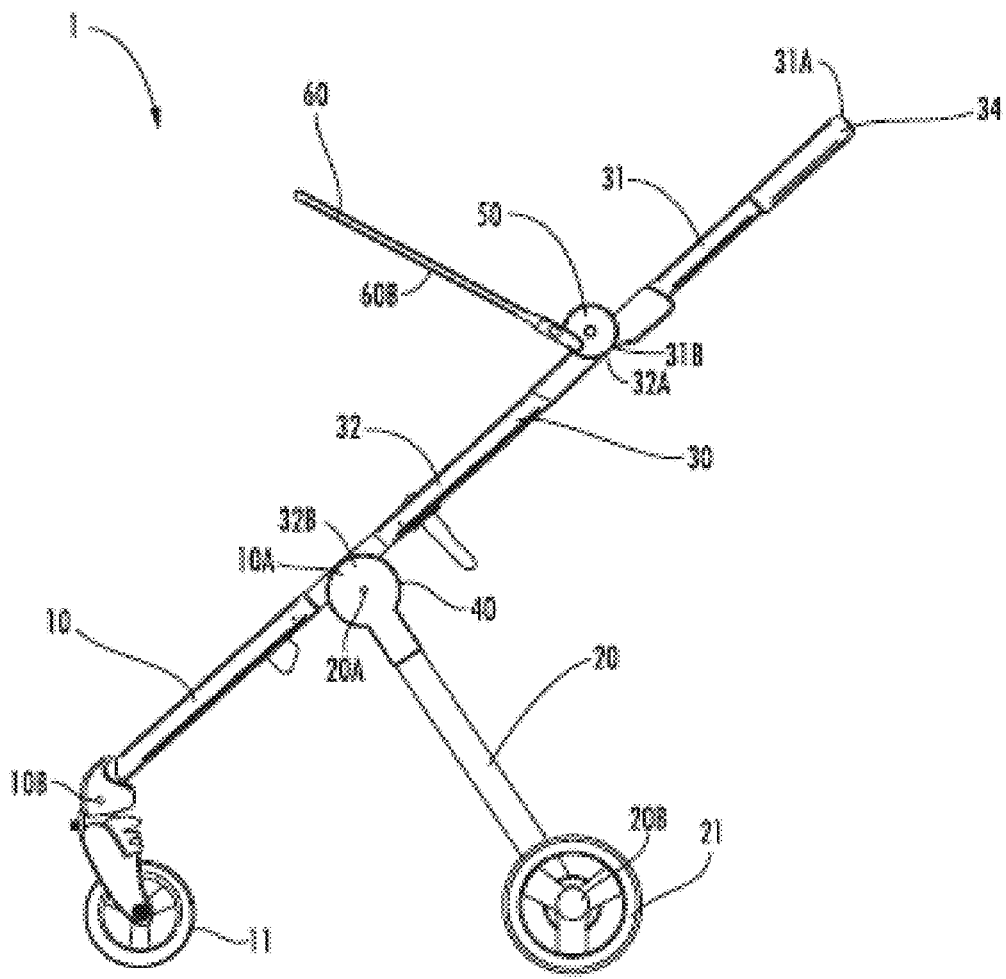
Figure 1B:
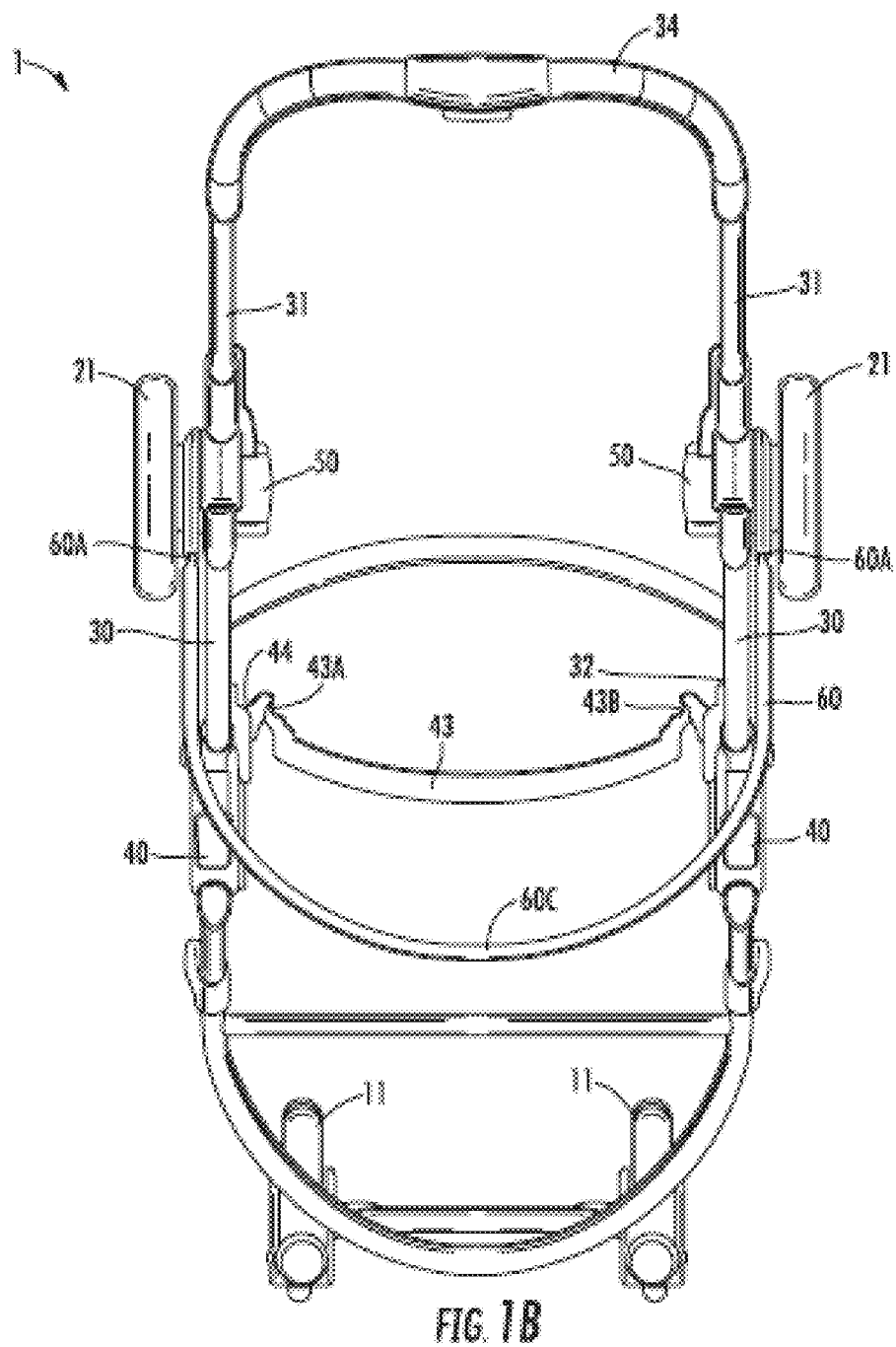
Figure 1C:
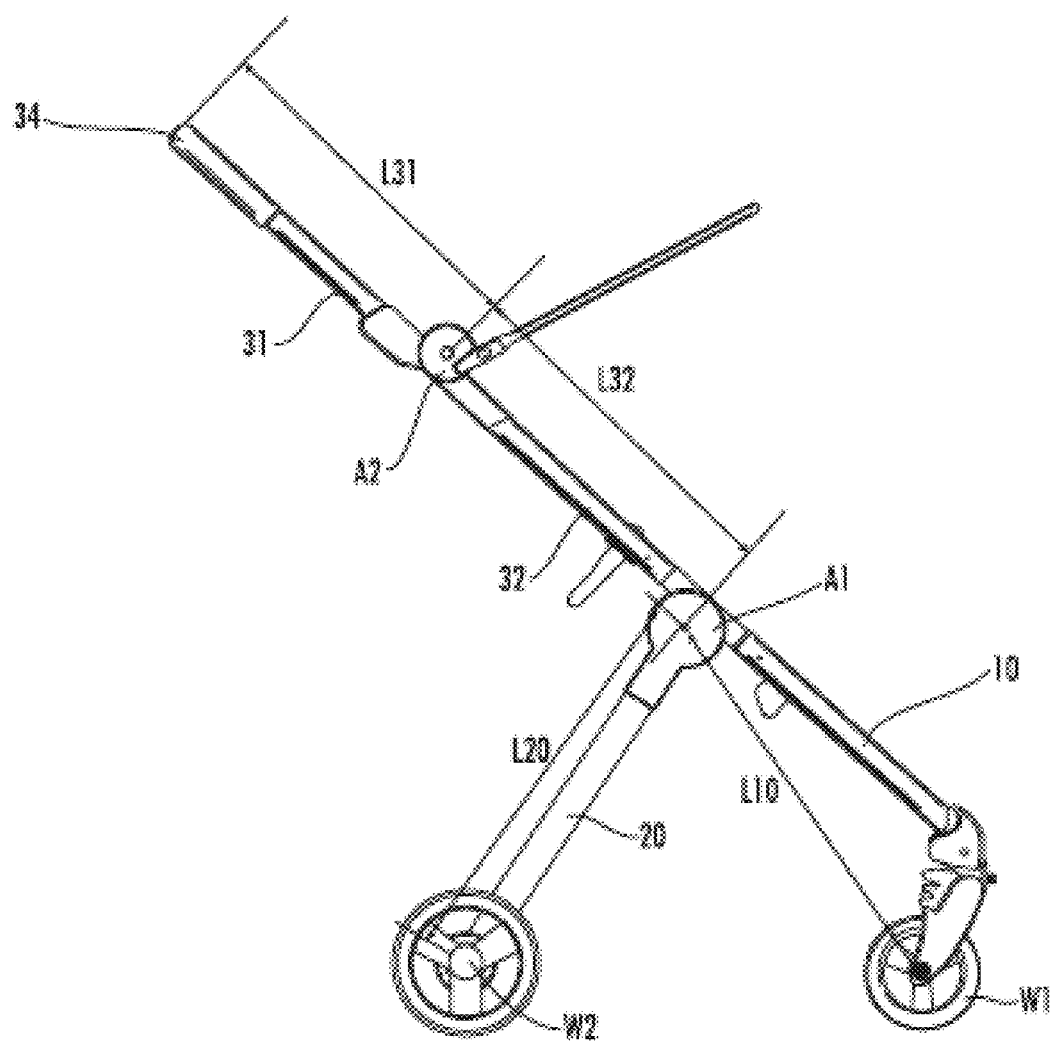
Figure 1D:
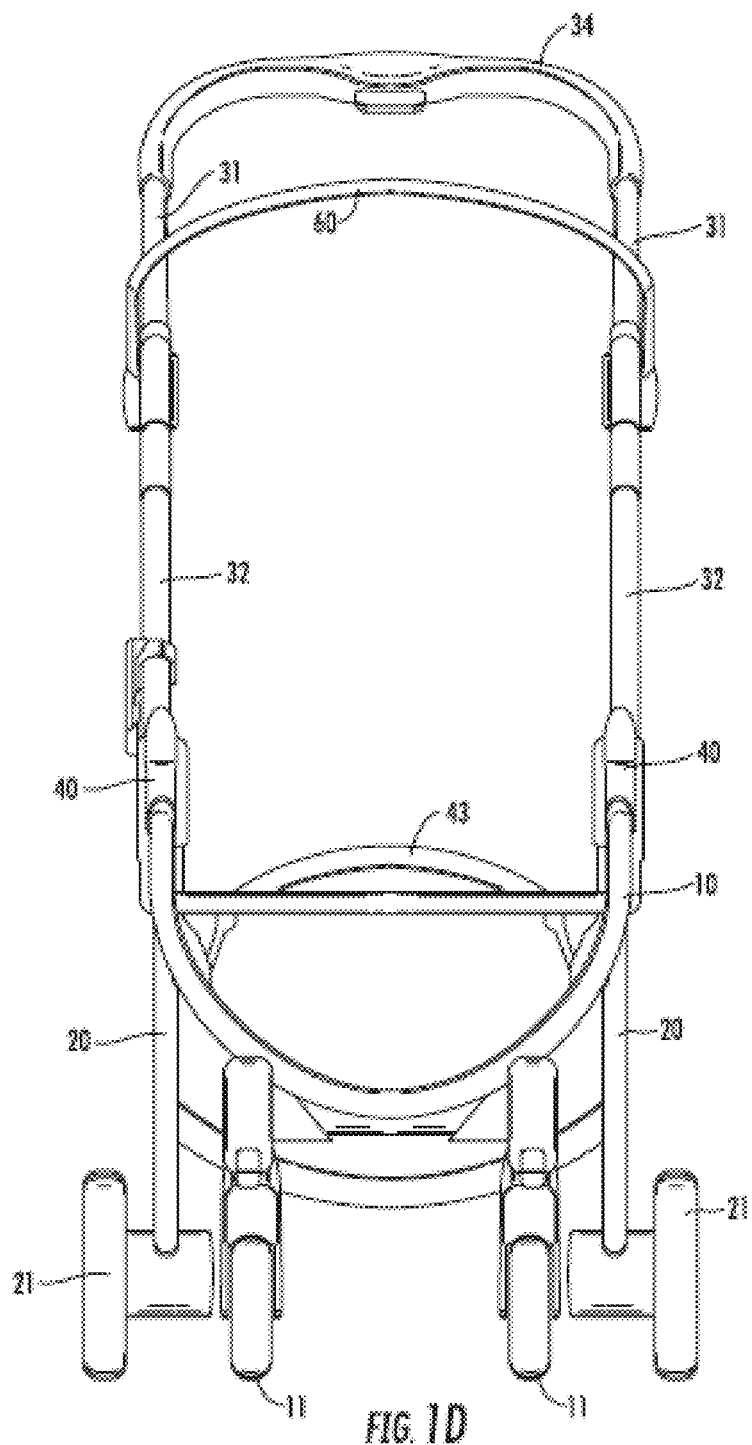
Figure 1E:
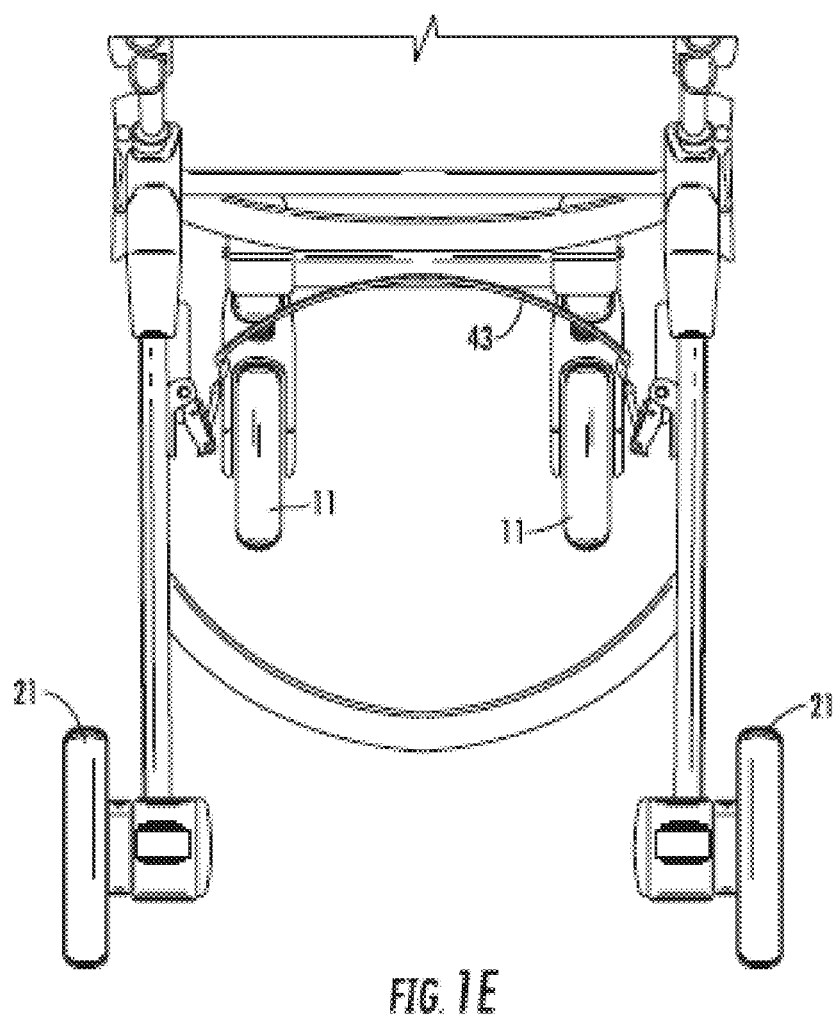
Figure 2:
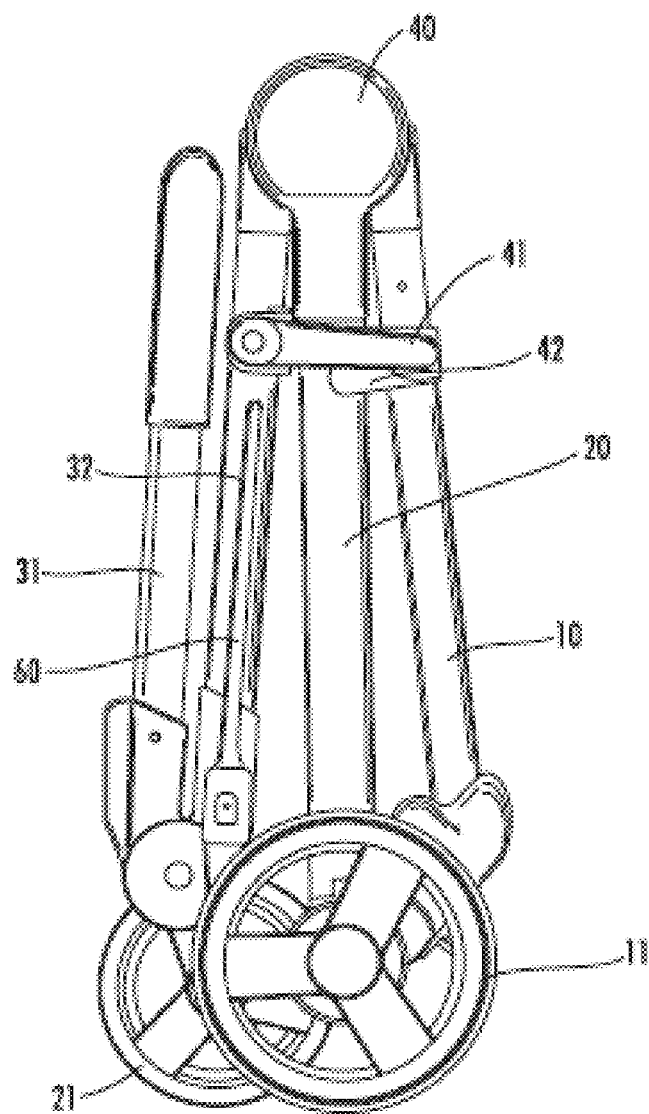
FIG. 2 is a right side elevation view of the stroller frame of FIGS. 1A-E in the folded, storage configuration according to one example embodiment of the disclosure.

In the example embodiment of the stroller frame 1 shown in FIGS. 1A-2, the front wheel frame(s) 10 rotates (as viewed from FIG. 1A) counterclockwise toward the rear wheel frame 20 to move from the unfolded, in-use configuration (FIG. 1A) to the folded, storage configuration (FIG. 2). Similarly, the handle frame 30 rotates (as viewed from FIG. 1A) clockwise toward the rear wheel frame 20 to move from the unfolded, in-use configuration (FIG. 1A) to the folded, storage configuration (FIG. 2).

The example stroller frame 1 can also include a seat or seat connector (not shown). In certain example embodiments, the seat can be permanently coupled to the stroller frame 1. Alternatively, the seat can be removably coupled to the stroller frame 1. For example, the stroller frame can further include a pair of seat connectors, each disposed on corresponding left and right sides of the stroller frame adjacent, for example the frame folding mechanism 40. The front wheel frame 10, the rear wheel frame 20, and the handle frame 30 are rotatably connected to one-another by the frame folding mechanism 40 and rotate relative to each other from the folded, storage configuration (as shown in FIG. 2) to the unfolded, in-use configuration (as shown in FIGS. 1A-E.

In certain example embodiments of the stroller frame of FIGS. 1A-2, each of the handle frame folding mechanisms 50 may be used to rotate the corresponding (e.g., left or right) upper handle frame 31 relative to the corresponding (e.g., left or right) lower handle frame 32 in either the clockwise or counterclockwise direction about the pivot axis of the handle frame folding mechanism 50. In one example, each of the upper handle frame members 31 may be folded to a compact folded handle configuration wherein the corresponding longitudinal axis of the upper handle frame 31 and longitudinal axis of the lower handle frame 32 are substantially parallel to each other. As used herein, the term "substantially parallel" means "within 20 degrees of a true parallel position" in its most compact position.

For example, as shown in FIG. 1A, the upper handle frame 31 (and its longitudinal axis) are presented in a substantially linear orientation with the lower handle frame 32 (and its longitudinal axis) and the front wheel frame 10. From this substantially linear position, the upper handle frame 31 may be rotated in the counterclockwise or the clockwise direction (relative to the view of FIG. 1A) around a pivot axis in the handle frame folding mechanism 50 approximately 180 degrees such that the upper handle frame 31 would be adjacent to the lower handle frame 32. The handle frame folding mechanism 50 may include a lock or stop to retain the upper handle frame 31 and the lower handle frame 32 in the substantially parallel handle frame folded configuration (as shown in FIG. 2). With the handle frame 30 in its folded configuration, the frame folding mechanism 40 may be unlocked and the handle frame 30, front wheel frame 10, and the rear wheel frame 20 may be rotated relative to each other into the folded storage configuration of the stroller 1, as shown in FIG. 2. Alternatively, the order of use of each folding mechanism 40, 50 may be reversed. Example embodiments of the folding mechanisms 40, 50 are described in U.S. Pat. Nos. 7,632,035; 6,095,548; 6,105,998; 6,991,248; and 6,102,431, the entire contents of each of which are hereby incorporated herein by reference for all purposes.

In this or other example embodiments, the handle frame folding mechanism 50 may also include one or more stops between the linear position of the upper frame member 31 and the lower frame member 32 (shown in FIGS. 1A-E) and handle frame folded position configuration (shown in FIG. 2). The one or more stops (not shown) can allow the height of the upper handle frame 31 near the first end 31A to be adjusted relative to the ground level or surface that the wheels 11, 21 of the stroller frame 1 are rolling on. The adjustment of the height of the upper handle frame 31 can accommodate the different heights of the user and/or the different heights that each user desires the handle to be at when pushing the stroller frame 1. The example stops may be used to adjust the height of the first end 31A of the upper handle frame in any desired increments.

For example, each stop may be used to adjust the height of the first end 31A of the upper handle frame 31 in a number of positions above and/or below the linear position. For example, with reference to FIG. 1A, the upper handle frame 31 may rotate relative to the lower handle frame 32 counterclockwise such that the handle grip portion 34 of the stroller frame 1 along the first end 31A is raised in height in 0.5 to 2 inch increments with the use of the different stops in the handle frame folding mechanism. In addition or in the alternative, the upper handle frame 31 may rotate relative to the lower handle frame 32 clockwise such that the handle grip portion 34 of the stroller frame 1 along the first end 31A is lowered in height in 0.5 to 2 inch increments to lower the first end 31A of the upper handle frame 31. Further, the handle folding mechanism 50 can include a multitude of stops that fix the first end 31A of the upper handle frame 31 at various heights at a position within 30 degrees on either side of the linear position and may also rotate without any further stop positions to the folded configuration shown in FIG. 2.

Thus, in certain example embodiments, the handle frame folding mechanism 50 allows rotation of the upper handle frame 31 from a position adjacent to and substantially parallel to the lower handle frame 32 to a position past the relative linear position (as shown in FIG. 1A) of the lower handle frame 32 and the upper handle frame 31. In certain example embodiments, the upper handle frame 31 can be rotated about the pivot axis of the handle frame folding mechanism 50 from a position adjacent to and substantially parallel to the lower handle frame handle 32 to a position past the relative linear position (as shown in FIG. 1A) of the lower handle frame 32 and the upper handle frame 31 to a position wherein the upper handle frame 31 is substantially parallel to a plane of the ground or other surface. As used herein, the "plane of the ground" is defined by the bottom of the wheels 11, 21 in contact with the surface on which the stroller frame 1 is rolling or resting.

In some example embodiments, the upper handle frame 31 can rotate counterclockwise (as shown relative to FIG. 1A) relative to the lower handle frame 32 to the handle folded configuration. In other example embodiments, the handle frame 30 may rotate counterclockwise forward about the pivot axis of the frame folding mechanism 40 to be adjacent to the front wheel frame 10 and the upper handle 31 may then rotate clockwise about the pivot axis of the handle frame folding mechanism 50 into the handle frame folded configuration.

In certain example embodiments the combined linear distance of the upper handle frame 31, from the first end 31A to the second end 31B, and the second linear distance of the lower handle frame 32, from the first end 32A to the second end 32B, is approximately twice as long as either the linear distance of the front wheel frame 10, from the first end 10A to the second end 10B, the linear distance of each of the rear wheel frames 20, from the first end 20A to the second end 20B, or both. However, the upper handle frame 31 is rotatably coupled to the lower handle frame 32 via the handle folding mechanism 50. That allows the handle frame 30 to be folded such that the length of the handle frame 30 in the folded configuration is approximately the same length as linear distance of the front wheel frame 10, the rear wheel frame 20 or both the front wheel frame 10, rear wheel frame 20.

For example, as shown in FIG. 1C, in order to provide a more compact folded configuration for the stroller frame 1, each of the major frame members (the upper handle frame 31, the lower handle frame 32, the front wheel frame 10 and the rear wheel frame 20) should have substantially equivalent lengths. As used herein, the four major frame members have "substantially equivalent lengths" if the length of each of the major frame members 31, 32, 10, and 20 is within 25% of the average of the lengths of the major frame members 31, 32, 10, and 20. In other example embodiments, the lengths of the four major frame members 31, 32, 10, and 20 are within 10% of the average of the lengths of the major frame members 31, 32, 10, and 20. The lengths of each of the major frame members 31, 32, 10, and 20 can be determined as shown in FIG. 1C.

The lengths of the major frame members 31, 32, 10, and 20 are measured from their respective rotational axes of the folding mechanisms 40, 50. For example, as shown in FIG. 1C, the length L10 of the front wheel frame 10 is measured from the rotational axis A1 of the frame folding mechanism 40 along a line to the rotational axis WI of the front wheel 11. The length L20 of the rear wheel frame 20 is measured from the rotational axis A1 of the frame folding mechanism 40 along a line to the rotational axis W2 of the rear wheel 21. The length L32 of the lower handle frame 32 is measured from the rotational axis A1 of the frame folding mechanism 40 along a line to the rotational axis A2 of the handle frame folding mechanism 50. The length of the upper handle frame 31 is measured from the end of the handle grip 34 along a line to the rotational axis A2 of the handle frame folding mechanism 50. As shown in FIG. 2, in one example, the upper handle frame 31 and the lower handle frame 32 have substantially equal lengths (within 10%, for example.) In other example embodiments, each handle frame 30 along the corresponding left and right sides of the stroller frame 1 may include at least two components that telescope within one another (e.g., the upper handle frame 31 could telescope within the lower handle frame 32 and could include a spring-loaded button on the upper handle frame 31 and an aperture for receiving the spring-loaded button on the lower handle frame 32 (or vice versa) for engaging/locking the handle frame 30 in the extended position without the need for the handle frame folding mechanism 50) to reduce the overall length of the handle frame 30 for adjusting the height of the handle grip and/or for compactly storing the stroller frame 1 in the folded configuration. In other example embodiments, the major frame members 31, 32, 10, and 20 may be any relative length.

Figure 3:
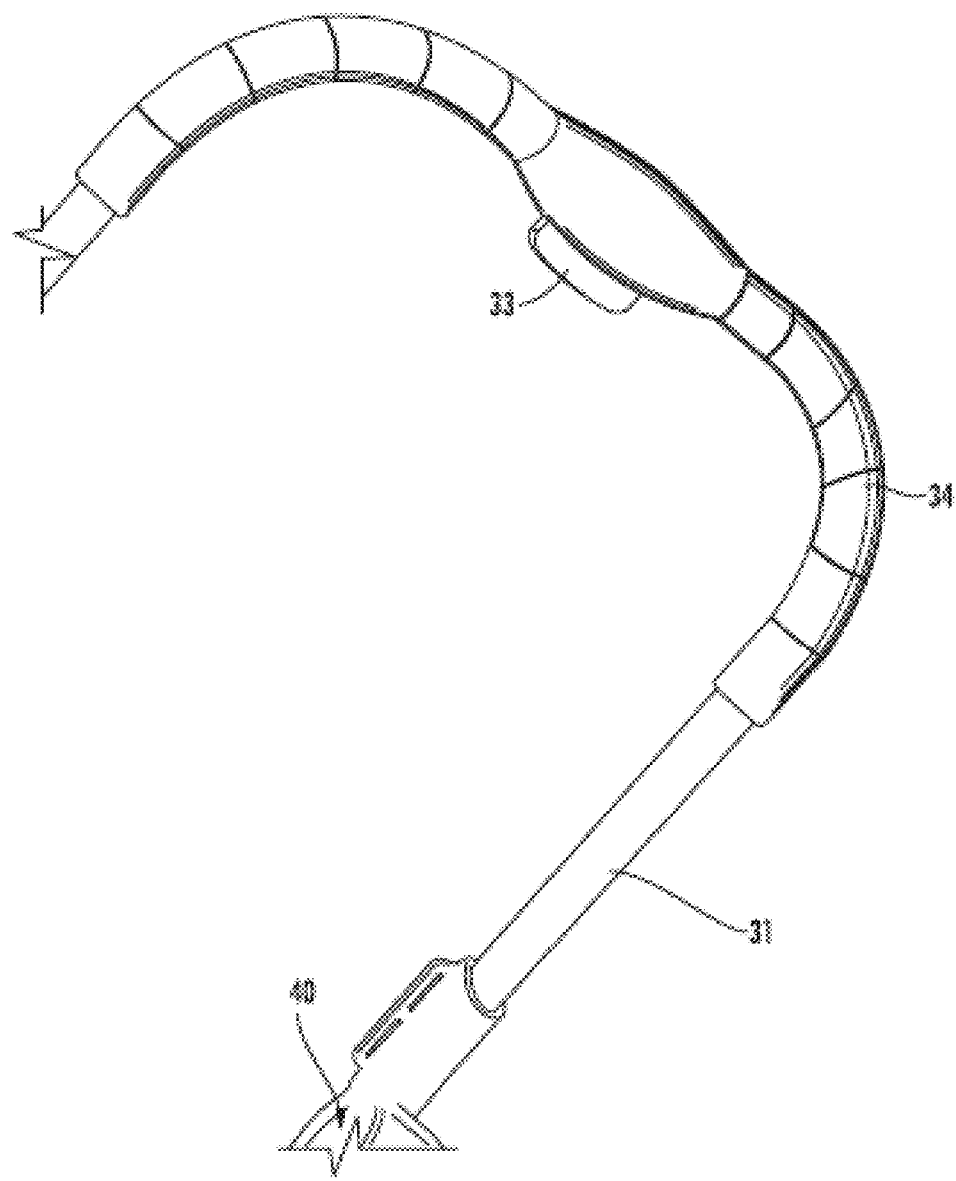
FIG. 3 is a partial perspective view of the handle grip of the handle frame of the stroller frame of FIGS. 1A-E and 6A-B according to one example embodiment of the disclosure.

FIG. 3 is a partial perspective view of upper handle frame 31 of the folding stroller frame 1 according to one example embodiment of the disclosure. Referring to FIGS. 1A-3, the stops in each of the handle frame folding mechanisms 50 may be engaged and disengaged using the handle folding mechanism latch 33 or other appropriate mechanism. The handle folding mechanism latch 33 may be disposed along and at least partially within and extend out from the handle grip portion 34 of the upper handle frame 31. In one example embodiment, the handle folding mechanism latch 33 may be a spring-biased hand-squeezable latch, button, or trigger that moves from an extended position to a retracted position and is spring-biased into the extended position, wherein in the extended position the handle folding mechanism latch 33 extends out from the handle grip portion 34 a first amount and in the retracted position the latch 33 extends out from the handle grip portion 34 a second amount that is less than the first amount. The handle folding mechanism latch 33 can be operably coupled to one or more cables or wires that extend from the handle folding mechanism latch 33 through the handle grip portion 34 of the upper handle frame 31, through each of the upper handle frames 31 and to a mechanism, such as a movable latch or pin, for engaging and disengaging with the handle frame folding mechanism 50 to adjust the mechanism 50 from the locked configuration (wherein rotation about the pivot axis of the handle frame folding mechanism 50 is prevented) to an unlocked configuration (wherein rotation about the pivot axis of the handle frame folding mechanism 50 occurs).

Referring back to FIGS. 1A-E, the example stroller frame 1 can also include a canopy frame 60. The canopy frame 60 can be rotatably coupled to the handle frame 30. In one example embodiment, the canopy frame 60 can include a pair of corresponding first ends 60A, a pair of arms 60B extending from the first ends 60A and front member 60C coupling together the pair of arms 60B. In one example embodiment, the first ends 60A, pair of arms 60B and front member 60C are integrally formed together from a single piece of material. Each of the first ends 60A can be directly or indirectly coupled to a corresponding one of the handle frame folding mechanisms 50 to allow the canopy frame 60 to rotate with respect to the handle frame 32 from a first position, where the arms 60B of the canopy frame are parallel or substantially parallel with the longitudinal axis of the upper frame handle 31, to a second position as shown in FIG. 1A. The canopy frame 60 can be made from metal or plastic solid or tubular material. Further, all or at least a portion of the canopy frame 60 can be covered in soft goods or other fabric material to provide a shade over the seating area of the stroller frame 1.

FIG. 4 is a partial perspective view of one of the frame folding mechanisms 40 of the stroller frame 1 according to one example embodiment of the disclosure. Now referring to FIGS. 1A-E and 4 the folding stroller frame 1 can also include one or more unlocking mechanism 44. Each unlocking mechanism 44 can be operably coupled to a corresponding one of the frame folding mechanisms 40. In one example embodiment, each unlocking mechanism 44 includes a manually adjustable lever that rotates about an axis and that includes an elongated member that is spring-biased into a first, locking position and can be pulled or pushed to rotate about the axis into a second, unlocking position to unlock the frame folding mechanism 40 and allow one or more of the handle frame 30, front wheel frame 10, and rear wheel frame 20 to rotate about the frame folding mechanism 40.

The folding stroller frame 1 can also include a frame folding mechanism unlocking strap 43 coupled to each of the unlocking mechanisms 44. In one example embodiment, the frame folding mechanism unlocking strap 43 can include a first end 43A coupled to a first unlocking mechanism 44 and a distal second end 43B coupled to a second unlocking mechanism 44. The frame folding mechanism unlocking strap 43 can be made from fabric, plastic, or a combination thereof. In use, a user of the stroller can provide a pull force on the frame folding mechanism unlocking strap 43 to simultaneously cause each of the unlocking mechanisms 44 to move from the first, locking position, to the second, unlocking position to unlock both of the frame folding mechanisms 40 with one hand at one time and allow one or more of the handle frame 30, front wheel frame 10, and rear wheel frame 20 to rotate about the frame folding mechanism 40.

FIGS. 5A-C are various views of a frame lock latch and a frame lock latch receiver for the stroller frame of FIGS. 1A-E and 6A-B in engaged and disengaged positions according to one example embodiment of the disclosure. Referring now to FIGS. 1A-E and 6A-B, the example folding stroller frame 1 can further include a frame lock latch 41 coupled to either the handle frame 30 or the front wheel frame 10. In one example embodiment, the frame lock latch 41 can be coupled to either the handle frame 30 (e.g., the lower handle frame 32) or the front wheel frame 10 adjacent the frame folding mechanism 40. The frame lock latch 41 can include a member having a first end coupled to the frame 1 and a distal, free second end and a longitudinal axis that extends between the first and second ends. The frame lock latch 41 can also include an engagement tab coupled at or near the second, free end of the member and extending orthogonally or substantially orthogonally to the longitudinal axis of the member. In certain example embodiments, the frame lock latch 41 can be rotatably coupled to either the lower handle frame 32 or the front wheel frame 10 and configured to be rotated from a storage position, where the longitudinal axis of the member is parallel to the longitudinal axis of the frame member 32 or 10 to which it is rotatably coupled, to a use position.

The folding stroller frame 1 can also include a frame lock latch receiver 42 coupled to the other one of the handle frame 30 and the front wheel frame 10 that the frame lock latch 41 is not coupled to. The frame lock latch receiver 42 can be coupled to the other one of the handle frame (e.g., the lower handle frame 32) and the front wheel frame 10 adjacent the frame folding mechanism 40 and on an opposite side of the frame folding mechanism 40 from the frame lock latch 41. The frame lock latch receiver 42 can include a receiving area for receiving and coupling to the engagement tab of the frame lock latch 41. In one example embodiment, the receiving area can include a detent, such as a recessed portion surrounded or at least partially surrounded by a raised portion, that is configured to receive at least a portion of the engagement tab in the recessed portion of the frame lock latch receiver 42.

FIG. 5A shows the frame lock latch 41 in the use position while the stroller frame 1 is in the unfolded, in-use configuration. FIGS. 5B-C show the engagement tab engaging the detent and coupling the frame lock latch 41 to the frame lock latch receiver 42 when the folding stroller frame 1 is in the folded, storage configuration. The coupling of the frame lock latch 41 with the frame lock latch receiver 42 helps to hold the frame members 30, 20, and 10 together when the stroller frame 1 is in the folded, storage configuration.

FIGS. 6A-6B are side and perspective views of stroller frame 1 with an optional belly bar 62 in the unfolded, in-use configuration according to one example embodiment of the disclosure. FIGS. 7A-7B are top and perspective views of the optional belly bar 62 for the stroller frame 1 according to one example embodiment of the disclosure. FIG. 8 is a perspective view of the stroller frame 1 with optional belly bar 62 in the folded, storage configuration according to one example embodiment of the disclosure. Now referring to FIGS. 1A-E and 6A-B, the example foldable stroller frame 1 can further include a belly bar 62. In one example embodiment, the belly bar 62 is removably coupled to the stroller frame 1. In another example embodiment, the belly bar 62 is fixedly or movably coupled to the stroller frame 1. In one example, the belly bar 62 can be coupled (either fixedly, movably, or rotatably) to each of the frame folding mechanisms 40 of the stroller frame 1.

The belly bar 62 can include a front member 65 having a first end and a distal second end. A first side member 69 can be coupled to and extend from or be integrally formed with the first end of the front member 65. In one example, the first side member 69 can have a longitudinal axis that extends in a direction orthogonal or substantially orthogonal to the longitudinal axis of the front member 65. The belly bar 62 can also include a second side member 70 that is coupled to and extends from or is integrally formed with the second end of the front member 65. In one example, the second side member 70 can have a longitudinal axis that extends in a direction orthogonal or substantially orthogonal to the longitudinal axis of the front member 65 and parallel or substantially parallel to the longitudinal axis of the first side member 69. In one example, all or a portion of the belly bar can be covered with soft goods or other fabric or plastic material.

The first side member 69 can further include an attachment member 64 disposed at a distal end of the first side member 69. The attachment member 64 can include a planar or substantially planar surface for engaging and coupling to an attachment mechanism at the frame folding mechanism 40. While the example embodiment of FIGS. 6A-6B and 8 shows the belly bar coupled to the planar folding mechanism 40, in other example embodiments, the belly bar is coupled to other portions of the stroller frame 1, such as one or more of the front wheel frame 10 and/or the lower handle frame 32.

The attachment member 64 can also include one or more apertures/holes 68 that extend through the attachment member. These apertures/holes 68 can be configured to receive an attachment tab, button, or other mechanism disposed on the frame folding mechanism 40. In certain example embodiments, the attachment member 64 can include a first aperture 68 that is configured to receive the attachment tab or other mechanism on the frame folding mechanism 40 when the stroller frame 1 is in an unfolded, in-use configuration, and a second aperture 68 that is configured to receive the attachment tab or other mechanism on the frame folding mechanism 40 when the stroller frame 1 is in a folded, storage configuration. In this example embodiment, each of the first and second apertures 68 are positioned on the attachment member 64 such that the belly bar 62 extends out further from the frame folding mechanism 40 when the second aperture 68 is used than when the first aperture 68 is used to couple the attachment member 64 to the frame folding mechanism 40.

The second side member 70 can further include an attachment member 63 disposed at a distal end of the second side member 70. The attachment member 63 can include a planar or substantially planar surface for engaging and coupling to an attachment mechanism at the other frame folding mechanism 40.

The attachment member 63 can also include one or more apertures/holes 67 that extend through the attachment member 63. These apertures/holes 67 can be configured to receive an attachment tab, button, or other mechanism disposed on the frame folding mechanism 40. In certain example embodiments, the attachment member 63 can include a first aperture 67 that is configured to receive the attachment tab or other mechanism on the frame folding mechanism 40 when the stroller frame 1 is in an unfolded, in-use configuration, and a second aperture 67 that is configured to receive the attachment tab or other mechanism on the frame folding mechanism 40 when the stroller frame 1 is in a folded, storage configuration. In this example embodiment, each of the first and second apertures 67 are positioned on the attachment member 63 such that the belly bar 62 extends out further from the frame folding mechanism 40 when the second aperture 67 is used than when the first aperture 67 is used to couple the attachment member 63 to the frame folding mechanism 40.

The belly bar 62 can also include a release button 66. The release button 66 can be disposed along and at least partially within the front member 65. In one example embodiment, the release button 66 can be operably coupled to the attachment mechanisms for attaching the belly bar 62 to the frame folding mechanisms 40 and can be configured to detach the belly bar 62 from each of the frame folding mechanisms when the release button 66 is depressed. The release button 66 can also include a biasing mechanism to spring-bias the release button into a first position corresponding to the belly bar being locked to each of the frame folding mechanisms 40.

While the example belly bar 62 of FIGS. 7A-7B is described as having multiple apertures 67-68 for attaching and extending or changing the length of extension of the belly bar 62 in relation to the frame folding mechanism 40 in an alternative embodiment, other mechanisms can be employed to change the length of extension of the belly bar 62 in relation to the frame folding mechanism, including, but not limited to, providing each of the first side member 69 and second side member 70 with telescoping members that can be extended and retracted to different lengths, making the length of each of the first side member 69 and second side member 70 manually adjustable from a first length to a second length greater than the first, making each of the attachment members 63, 64 removable from the respective first side member 69 and second side member 70 and providing replacement attachment members that are longer or shorter than the attachment members 63, 64 to increase or reduce the length of extension of the belly bar 62 from the frame folding mechanisms 40, or constructing each of the attachment members 63, 64 in two parts that are slidably adjustable to change the placement of the apertures 67, 68 and change the distance of extension of the belly bar 62 from the frame folding mechanisms 40. In one example, the first side member 69 and the second side member 70 can each be constructed of two or more telescoping members such that each of the first side member 69 and second side member 70 can be manually adjusted from a first position having a first length to a second position having a second length, wherein the second length is greater than the first length and wherein the first side member 69 and second side member 70 are longer in the second position than in the first position. Each of the minor telescoping portions of the first side member 69 and second side member 70 can further include an adjustable latching mechanism that operatively couples to a corresponding latching mechanism positioned in an outer wall of one or more of the major telescoping portions of the first side member 69 and second side member 70 (e.g., the one or more minor telescoping portions of each side member 69, 70 being configured to be slidably received into an interior passageway of each of one or more of the major telescoping portions of each side member 69, 70). The release button 66 may then be operatively coupled (e.g., via one or more cables) to the adjustable latching mechanism(s) to release the latching mechanism when the user wants to adjust the length of the first side member 69 and second side member 70. One example of an adjustable latching mechanism is a spring-loaded ball or pin and a corresponding detent or aperture for receiving the spring-loaded ball or pin to hole the side members in a stationary position. Further, the first side member 69 and second side member 70 may be telescoping and manually adjustable between more than a first and second position. Such adjustability allows the user to manually select the length of the first 69 and second 70 side members to position the belly bar at the desired height when pulling the stroller 1 in the folded configuration.

As shown in FIG. 8, in the folded, storage configuration, the belly bar 62 will not rotate about the frame folding mechanism to be parallel or substantially parallel with and disposed against the handle frame 30, the front wheel frame 10, and/or the rear wheel frame 20. Instead, the belly bar 62 is configured to be the pull handle for the stroller frame 1 in the folded, storage configuration. The user can grasp the belly bar 62 when the stroller frame 1 is in the folded, storage configuration and can roll the stroller frame on the rear wheels 21 of the stroller frame. In certain example embodiments, the belly bar 62 can be adjusted from a first position to a second position, wherein the belly bar 62 extends out from the frame folding mechanism further in the second position than the first position, prior to using the belly bar 62 as a pull handle for the stroller frame in the folded, storage configuration.

FIG. 9 is a partial view of an optional secondary release mechanism 91 for the frame folding mechanism 40 of FIGS. 1A-E and 6A-B. Now referring to FIGS. 1A-E, 4, 6A-B and 9, the example secondary release mechanism 91 can be incorporated or operably coupled to one or more of the unlocking mechanisms 44 shown and described with regard to FIG. 4. In certain example embodiments, the secondary release mechanism 91 is a push button; however, other forms of release mechanisms can be substituted for the push button. The secondary release mechanism 91 can include a latching mechanism 92 that is operably coupled to the unlocking mechanism 44 and can prevent the unlocking mechanism from being moved from the first, locking position to the second, unlocking position unless and/or until the push button 91 is depressed. In this manner, a user would need to depress the push button 91 and then subsequently pull the frame folding mechanism unlocking strap 43 to move the unlocking mechanisms from the first, locking position to the second, unlocking position and to allow the frame members 10, 20, and 30 to rotate about the pivot axis of the frame folding mechanism 40. While one secondary release mechanism 91 is shown, in certain example embodiments, a secondary release mechanism 91 can be operably coupled to each of the unlocking mechanisms 44 for each of the frame folding mechanisms 40 on the folding stroller frame 1.

FIG. 10 is a partial perspective view of an optional modification presented on one of the handle frame folding mechanisms 50 of the folding stroller frame 1 of FIGS. 1A-E and 6A-B according to one example embodiment of the disclosure. Referring to FIG. 10, the modified handle frame folding mechanism 50 can include a first rotating hub 1001 that includes a slot 1005 along the inner portion of the hub 1001. The mechanism 50 also includes a second rotating hub 1003 that includes an adjustable tab (not shown) configured to engage and at least be partially received within the slot 1005 when the handle upper handle frame 31 is folded to be disposed alongside and substantially parallel with the lower handle frame 32. The addition of the tab and slot on the two portions of the handle frame folding mechanism can provide a more robust locking mechanism for holding the upper handle frame 31 in place in the folded configuration.

With the aforementioned disclosed structure, when the stroller frame 1 is in the unfolded, in-use configuration as shown in FIGS. 1A-E, the user may fold the stroller frame 1 by pressing the folding mechanism release latch 33 and rotating the upper handle frame 31 forward and in the counterclockwise direction (as shown in FIG. 1A) to a position adjacent to the lower handle frame 32. The user can then pull or lift the frame folding mechanism unlocking strap 43 (or optionally press the secondary release mechanism 91 and then pull the strap 43) to release the frame folding mechanism 40 from the locked, unfolded, in-use configuration to move the stroller frame 1 to the folded, storage configuration as shown in FIGS. 2 and 8, so that the stroller frame 1 can be folded to reduce the length (or height) of the stroller frame 1 into a more compact size than a stroller without a folding handle frame as described herein.

The frame lock latch 41 may be engaged with the frame lock latch receiver 42 to retain the stroller frame 1 in the folded configuration. Other mechanisms may also be used to retain the stroller frame 1 in the unfolded and/or folded configurations.

FIGS. 11A-D are various views of another stroller frame 100 in the unfolded, in use configuration, and certain elements of the stroller frame according to one example embodiment of the disclosure. Now referring to FIGS. 11A-D, the example foldable stroller frame 100 can include a pair of handle frames 130, each disposed on corresponding left and right sides of the stroller frame 100. Each handle frame 130 can be constructed of a solid core or tubing material made of metal or plastic. Each handle frame 130 can include a pair (e.g., left and right side) of upper handle frames 131 and a corresponding pair (e.g., left and right side) of lower handle frames 132. Each of the upper handle frames 131 can extend from a corresponding first end 131A to a corresponding distal second end 131B and define a linear distance for each of the upper handle frames 131. Each of the lower handle frames 132 can extend from a first end 132A to a distal second end 132B and define a second linear distance for each of the lower handle frames 132. Link plates 191 can be coupled to each of the distal second ends 132B of the lower handle frames 132 to couple the lower handle frames 132 to the frame folding mechanism 140. In certain example embodiments, the foldable stroller frame 100 further includes a handle grip portion 134 that extends between the corresponding first ends 131A of each of the upper handle frames 131 and couple the upper handle frames 131 together. In certain example embodiments, each of the upper handle frames 131 and the handle grip portion 134 are made of separate pieces of solid core or tubing material made of metal or plastic. Alternatively, each of the upper handle frames 131 and the handle grip portion 134 can be integrally formed from a single unitary piece of material.

Each of the upper handle frames 131 can be rotatably coupled to the lower handle frame 132. In one example embodiment, each of the second ends 131B of the upper handle frames 131 is coupled to a corresponding handle frame folding mechanism 150. Further, each of the first ends 132A of the lower handle frame 132 are coupled to the corresponding handle frame folding mechanism 150 to rotatably couple the lower handle frame 132 to the upper handle frame 131 on each of the left and right sides of the stroller frame 100. In certain example embodiments, the handle frame folding mechanism 150 may be disposed substantially in a central portion of the handle frame 130. For example, the upper handle frame 131 and the lower handle frame 32 may be substantially the same length from the pivot axis A12 of the handle folding mechanism 150 (as shown in FIG. 1B). The upper handle frame 131 and the lower handle frame 132 can be substantially linear in one of the unfolded configurations and substantially parallel in the folded configuration, such as in a standard butt hinge. Alternatively, either the upper handle frame 131 or the lower handle frame 132 may have a smaller length or width such that one frame 131 or 132 may be folded to be within the other frame.

Referring to FIGS. 11A-D and 14, the folding of the handle frame 130 may be engaged using the handle folding mechanism latch 133 or other appropriate mechanism. The handle folding mechanism latch 133 may be disposed along and at least partially within and extend out from the handle grip portion 134 of the upper handle frame 131. In one example embodiment, the handle folding mechanism latch 133 may be a spring-biased hand-squeezable latch, button, or trigger that moves from an extended position to a retracted position and is spring-biased into the extended position, wherein in the extended position the handle folding mechanism latch 133 extends out from the handle grip portion 134 a first amount and in the retracted portion the latch 133 extends out from the handle grip portion 134 a second amount that is less than the first amount. The handle folding mechanism latch 133 can be operably coupled to one or more cables or wires 202, 204. Each wire or cable 202, 204 can include a first end 202A, 204A coupled to the latch 133 and a distal second end 202B, 204B. The wire or cable 202, 204 can extend from the handle folding mechanism latch 133 through the handle grip portion 134 of the upper handle frame 131, through each of the upper handle frames 131 and to a mechanism, such as a movable handle retaining latch or pin, for engaging and disengaging with the handle frame folding mechanism 150 to adjust the mechanism 150 from the locked configuration (wherein rotation about the pivot axis A12 of the handle frame folding mechanism 150 is prevented) to an unlocked configuration (wherein rotation about the pivot axis A12 of the handle frame folding mechanism 150 occurs). For example, as the user squeezes the latch 133, tension is created in each of the cables 202, 204, and the second end 202B, 204B of the cable 202, 204 is pulled up towards the handle grip portion 134, which pulls the handle retaining pin within the handle frame folding mechanism 150 and unlocks the handle frame folding mechanism 150. This allows the upper handle frame 131 to rotate about the pivot axis A12 in the direction R1.

As the upper handle frame 131 is rotated in the direction R1, a portion of the upper handle frame folding mechanism 150 moves the release pin from a frame lock position to a frame release position by contacting and pushing the frame release pin 402 in the direction D5 in each of the upper handle frame folding mechanisms 150. In one example embodiment, the frame release pin 402 is operably coupled to the frame folding mechanism 140 and movement of the frame release pin 402 in the direction D5 causes the corresponding frame folding mechanism 140 to adjust from a locked configuration (where rotation about the pivot axis A13 of the frame folding mechanism 140 is prevented) to an unlocked configuration (wherein rotation about the pivot axis A13 of the frame folding mechanism 140 occurs).

FIGS. 15A-D is a partial-exploded view of the frame folding release mechanism and frame folding mechanism to fold the stroller frame of FIGS. 11A-D according to one example embodiment of the disclosure. Referring to FIGS. 11A-D, 14, and 15A-D, the frame release pin 402 can be mounted or otherwise coupled to a pin mounting member 502 along a first end of the pin mounting member 502. The pin mounting member 502 can be partially disposed within the upper handle frame folding mechanism 150 and the lower handle frame 132. In one example, two pin mounting members 502 are provided, one in each of the left and right lower handle frames 132 and upper handle frame folding mechanisms 150 along each left and right side of the stroller frame 100.

Each pin mounting member 502 can be directly or indirectly coupled to a corresponding spring biasing member 504. In one example, the spring biasing member 504 biases the pin mounting member 502 and pin 402 in the frame lock position and returns the pin 402 and pin mounting member 502 attached thereto to the frame lock position when the portion of the upper handle frame folding mechanism 150 is no longer contacting the pin 402. In one example embodiment, the spring biasing member 504 can be a spring, such as a tension spring. However, other biasing devices, such as flexible bands, may optionally be used. The spring biasing member 504 can have a first end 506 directly or indirectly coupled to the pin mounting member 502 and a distal second end 508 directly or indirectly coupled to the frame hinge latch release member 510. For example, a cable 512 can have a first end coupled to the pin mounting member 502 and a distal second end coupled to the spring biasing member 504 inside each of the left and right lower handle frames 132.

The frame hinge latch release member 510 can be an elongated member having a first end 516 and a distal second end 518. The frame hinge latch release member 510 can include a bottom edge 520 and an opposing top edge 522 that can extend from the first end 516 towards the second end 518. The distance from the bottom edge 520 to the top edge 522 can be substantially constant for a substantial portion of the length of the member 510 between the first end 516 and second end 518. The member 510 can further include a notch or recess 514 along the bottom edge 520 of the member 510. This notch or recess 514 defines a cavity for receiving a frame folding mechanism release pin 530 at least partially therein. Further, the notch or recess 514 reduces the distance from the bottom edge 520 to the top edge 522.

For example, the frame folding mechanism release pin 530 may be part of and within the frame folding mechanism 140. The release pin 530 can be spring biased in the direction D7 and can be configured to ride along the bottom edge 520 of the frame hinge latch release member 510. As the upper handle frame 131 is rotated in the direction R1 and a portion of the handle frame folding mechanism 150 contacts the pin 402 and causes the pin 402 to move in the direction D5. Movement of the pin 402 in direction D5 creates tension on the pin mounting member 502 that overcomes the spring force of the spring biasing member 504 and causes the frame hinge latch release member 510 to be pulled in the direction D6. Movement of the member 510 in the direction D6, which can be the same direction as D5, causes the bottom edge 520 of the member 510 to slide along the frame folding mechanism release pin 530. When the release pin 530 enters into the notch or recess 514, because spring biasing of the release pin 530 causes the release pin 530 to move in the direction D7, it unlocks the frame folding mechanism 140 from a locked configuration and allows the lower handle frames 132, front wheel frames 110, and rear wheel frames 120 all to be able to rotate with respect to one-another for each of the frame folding mechanisms 140.

FIGS. 16A-B are partial-exploded views of one of the seat attachment mechanisms for the stroller frame 100 of FIGS. 11A-D according to one example embodiment of the disclosure. Referring to FIGS. 11A-16B, the frame folding mechanism 140 can further include a mechanism for controlling the rotation of the entire seat 212 (e.g., rotation of both the seat back 214 and seat bottom 216). For example, the frame folding mechanism 140 can include a seat attachment plate 602 directly or indirectly coupled to the seat folding mechanism 140. The seat attachment plate 602 can include the seat connector 187 for slidably receiving therein one of the corresponding seat attachment tabs 218 to couple the seat 212 to the stroller frame 100. In one example, the seat connector 187 can include one or more channels and/or slots for slidably receiving the seat attachment tab therein 218. The seat attachment plate 602 can also include a seat rotation stop tab 185, which can be positioned below the seat connector 187 on the outer surface of the seat attachment plate 602. In one example, the seat rotation stop tab 185 can be a raised linear member disposed along the outer surface of the seat attachment plate and extending radially inward from an outer edge of the seat attachment plate 602.

The frame folding mechanism can further include a spring-biased seat rotation control member 606. In one example, the seat rotation control member 606 can be disposed along the first end 120A of the rear wheel frame 120. The seat rotation control member 606 can be configured to move along the longitudinal axis of the rear wheel frame 120 in the directions D8 and D9. In one example, the seat rotation control member can be biased in the direction D9. The seat rotation control member 606 can include a channel or slot 608 along one side of the seat rotation control member 606. The channel or slot 608 can be elongated and extend along the longitudinal axis of the seat rotation control member 606. The channel or slot 608 can be configured to receive at least partially therein the seat rotation stop tab 185. For example, when the seat rotation control member is biased in the direction D9 and at least a portion of the seat rotation stop tab 185 is disposed within the channel or slot 608, the entire seat (i.e. both the seat bottom 216 and seat back 214 as well as the belly bar 162 altogether) can be prevented from rotating with respect to the remainder of the stroller frame 100. However, it does not prevent the seat back 214 and belly bar 162 from rotating with respect to the seat bottom 216 as discussed in greater detail below.

The seat attachment plate 602 can be coupled to the frame folding mechanism 140. For example, the frame folding mechanism 140 can include a back wheel frame link plate 610 coupled to the first end 120A of the back wheel frame 120 and the frame folding mechanism 140. A cover plate 604 can be positioned over the back wheel frame link plate 610 and at least a portion of the seat rotation control member 606. The cover plate 604 can include a cavity and an opening for slidably receiving the seat rotation control member 606 therein and can be at least partially disposed over the seat rotation control member 606. The seat attachment plate 602 can then be coupled to the frame folding mechanism 140 over the cover plate 604, which is positioned between the rear wheel frame link plate 610 and the seat attachment plate 602 along the frame folding mechanism 140. The seat attachment plate 602 is capable of rotating in either the direction R4 or R5 with respect to the remainder of the frame folding mechanism 140 and the stroller frame 100 when the rotation stop tab 185 is not in the channel or slot 608 of the spring-biased seat rotation control member 606.

In one example of how the rotation of the seat attachment mechanism is controlled, as the upper handle frame 131 is rotated in the direction R1 and a portion of the handle frame folding mechanism 150 contacts the pin 402 and causes the pin 402 to move in the direction D5. Movement of the pin 402 in direction D5 creates tension on the pin mounting member 502 that overcomes the spring force of the spring biasing member 504 and causes the frame hinge latch release member 510 to be pulled in the direction D6. Movement of the member 510 in the direction D6, which can be the same direction as D5, causes the seat rotation control member 606 to be moved in the direction D8. Once the seat rotation control member 606 moves far enough in the direction D8 that the rotation stop tab 185 is no longer within the channel or slot 608, the seat attachment plate 602 and the seat 212 attached thereto is free to rotate in either of the directions R4 or R5. The spring biasing of the seat rotation control member 606 in the direction D9 ensures that when the seat attachment plate 602 and the seat 212 attached thereto are rotated back into a use position, the seat rotation control member 606 will slide back over the rotation stop tab 185, which will be disposed at least partially within the channel or slot 608 to prevent further rotation of the seat attachment plate 602 and the seat 212 attached thereto.

In certain example embodiments, the handle frame folding mechanism 150 can also include a mechanism to lock the handle frame 130 in at least an unfolded configuration. Further, in this or other example embodiments, the handle frame folding mechanism 150 may be able to be locked in the folded storage position and in a plurality of handle height adjustment positions. In another example embodiment, the handle frame 130 can include two folding mechanisms on each side of the stroller frame 100, one for folding the handle frame 130 (e.g., folding the lower handle frame 132 and the upper handle frame 131) in half and the other for adjusting the height of the handle grip 134.

Returning to FIGS. 11A-D, the example folding stroller 100 can also include one or more front wheel frames 110 that extend from a pair of first ends 110A to a distal second end 110B. Each front wheel frame 110 can be constructed of a solid core or tubing material made of metal or plastic. In certain example embodiments, each of the first ends 110A of the front wheel frame 110 is rotatably coupled to the corresponding second ends 132B of the lower handle frames 132 via corresponding frame folding mechanisms 140 on each of the left and right sides of the stroller frame 100. For example, the front wheel frame can include link plates 193 that can be coupled to each of the first ends 110A of the front wheel frame 110 to couple the front wheel frame 110 to the frame folding mechanism 140. One or more front wheels 111 can be operatively coupled to the front wheel frame 110. In certain example embodiments, two front wheels 111 are provided. In another example embodiment, one front wheel 111 is provided on the stroller frame 100. Each front wheel 111 can rotate about a horizontal axis parallel or substantially parallel to the surface that the stroller frame 100 is disposed on. In certain example embodiments, each front wheel 111 can also rotate about a vertical axis that is orthogonal or substantially orthogonal to the surface that the stroller frame 100 is disposed on. In some example embodiments, the front wheels 111 may be rotatably or foldably connected to the front wheel frame 110 such that the wheels 111 may be rotated or folded to a position that reduces the size, length, or volume of the stroller frame 100 in its folded, storage configuration. In other example embodiments, the front wheels 111 may be removably coupled to the front wheel frame 110 such that the front wheels 111 may be removed from the front wheel frame 110 to reduce the size, length, or volume of the stroller frame 100 in its folded, storage configuration.

Figure 11A:
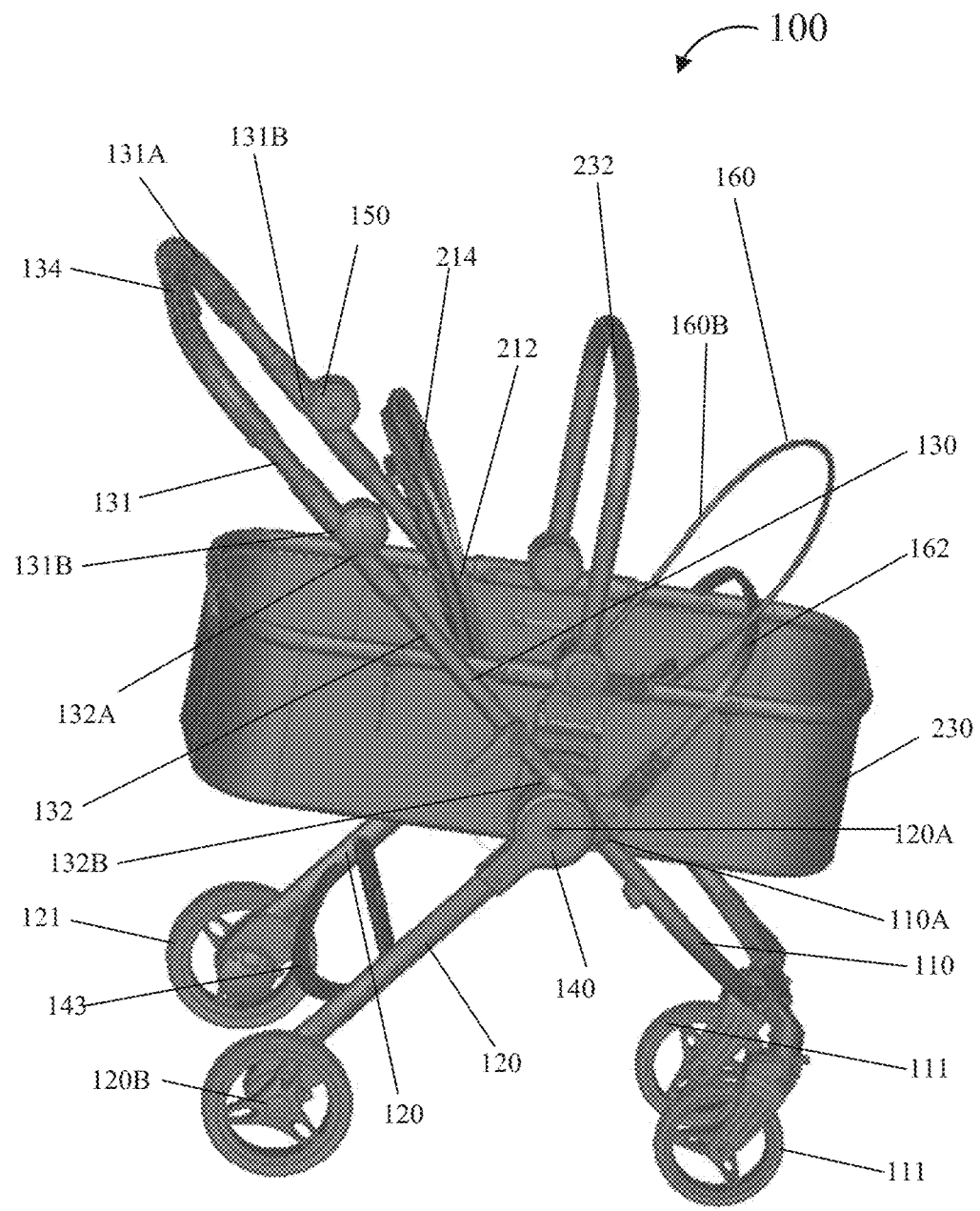

The example folding stroller 100 can also include one or more rear wheel frames 120 that extend from a pair of first ends 120A to a pair of distal second ends 120B. For example, as shown in FIGS. 11A and 11D, the folding stroller 100 can include a pair of rear wheel frames 120, with each of the rear wheel frames 120 disposed on corresponding left and right sides of the stroller frame 100. Each rear wheel frame 120 can be constructed of a solid core or tubing material made of metal or plastic. In certain example embodiments, each of the first ends 120A of the rear wheel frame 120 is rotatably coupled to the corresponding second ends 132B of the lower handle frames 132 and the corresponding first ends 110A of the front wheel frame 110 via corresponding frame folding mechanisms 140 on each of the left and right sides of the stroller frame 100. One or more rear wheels 111 can be coupled to each rear wheel frame 120. In certain example embodiments, two rear wheels 121 are provided, one on each rear wheel frame 120; however, greater or fewer numbers of wheels are contemplated within this disclosure. Each rear wheel 121 can rotate about a horizontal axis parallel or substantially parallel to the surface that the stroller frame 100 is disposed on. In some example embodiments, the rear wheels 121 may be rotatably or foldably connected to the rear wheel frame 120 such that the rear wheels 121 may be rotated or folded to a position that reduces the size, length, or volume of the stroller frame 100 in its folded, storage configuration. In other example embodiments, the rear wheels 121 may be removably coupled to the rear wheel frame 120 such that the rear wheels 121 may be removed from the rear wheel frame 120 to reduce the size, length, or volume of the stroller frame 100 in its folded, storage configuration.

Substantially the same as that described with reference to FIG. 4, the stroller frame 100 can further include one or more unlocking mechanisms. Each unlocking mechanism can be operably coupled to a corresponding one of the frame folding mechanisms 140. In one example embodiment, each unlocking mechanism includes a manually adjustable lever that rotates about an axis and that includes an elongated member that is spring-biased into a first, locking position and can be pulled or pushed to rotate about the axis into a second, unlocking position to unlock the frame folding mechanism 140 and allow one or more of the handle frame 130, front wheel frame 110, and rear wheel frame 120 to rotate about the frame folding mechanism 140.

The folding stroller frame 100 can also include a frame folding mechanism unlocking strap 143 (FIG. 11D) directly or indirectly coupled to each of the unlocking mechanisms. In one example embodiment, the frame folding mechanism unlocking strap 143 can include a first end 143A coupled to a first unlocking mechanism and a distal second end 143B coupled to a second unlocking mechanism. The frame folding mechanism unlocking strap 143 can be made from fabric, plastic, or a combination thereof. In use, a user of the stroller can provide a pull force on the frame folding mechanism unlocking strap 143 to simultaneously cause each of the unlocking mechanisms to move from the first, locking position, to the second, unlocking position to unlock both of the frame folding mechanisms 140 with one hand at one time and allow one or more of the handle frame 130, front wheel frame 110, and rear wheel frame 120 to rotate about the frame folding mechanism 140.

The example stroller frame 100 can also include a seat 212 that can be removably coupled to the stroller frame 100 in both a forward-facing configuration, as shown in FIG. 11A, and a rearward-facing configuration. For example, the stroller frame 100 can further include a pair of seat connectors 187, each disposed on corresponding left and right sides of the stroller frame 100 adjacent or integrated into, for example, the frame folding mechanism 140. Each seat connector 187 can be configured to slidably couple to a corresponding seat attachment tab 218 (see FIG. 12C) disposed along the corresponding left and right sides of the seat 212.

Figure 12A:
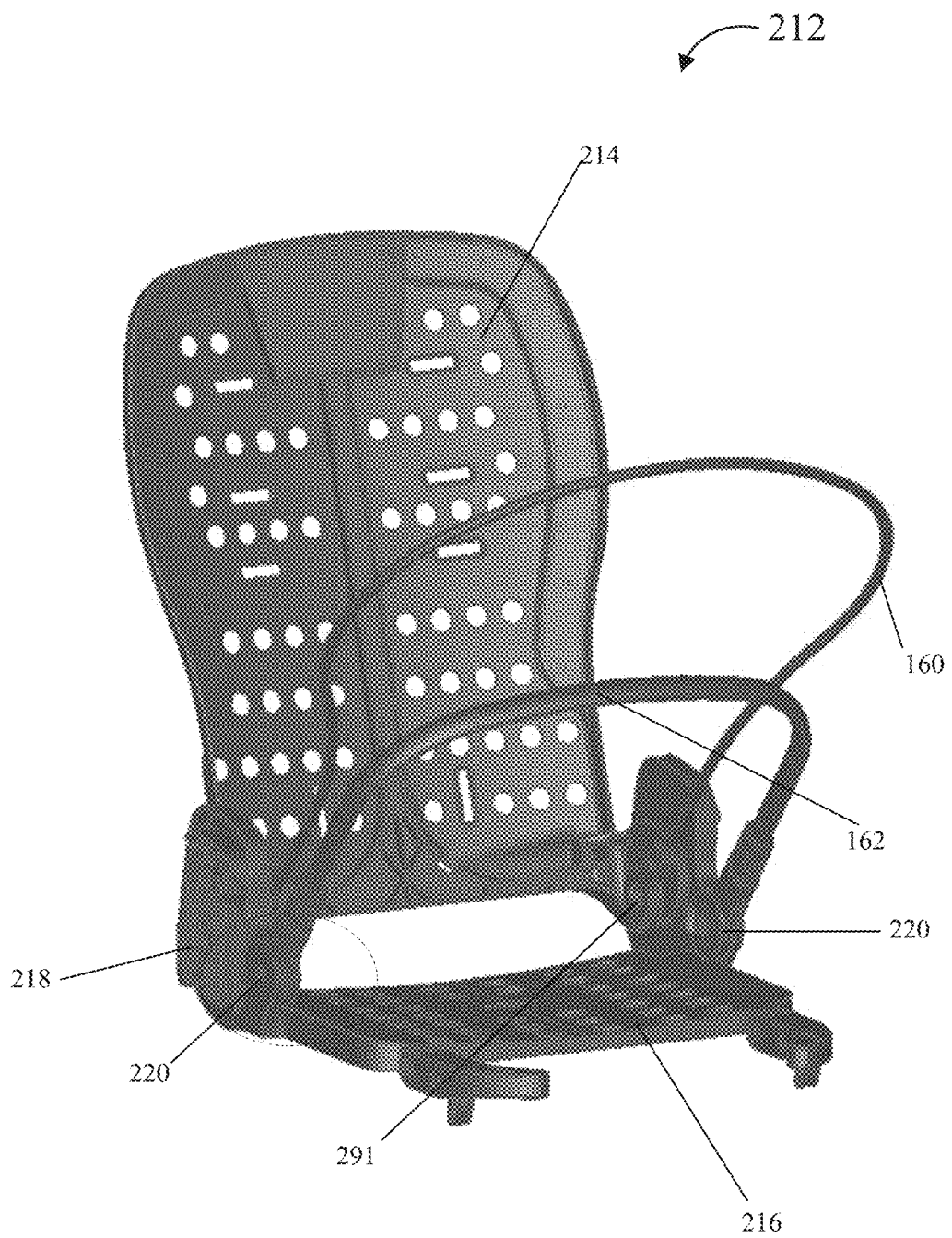
Figure 12B:
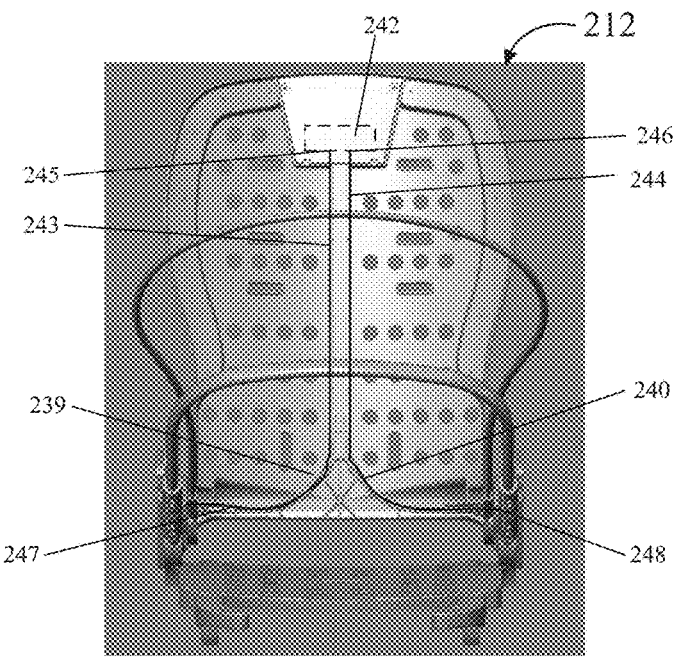
Figure 12C:
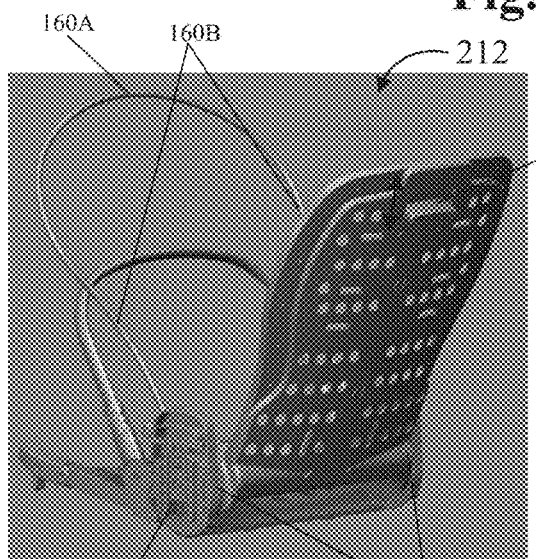
Figure 12D:
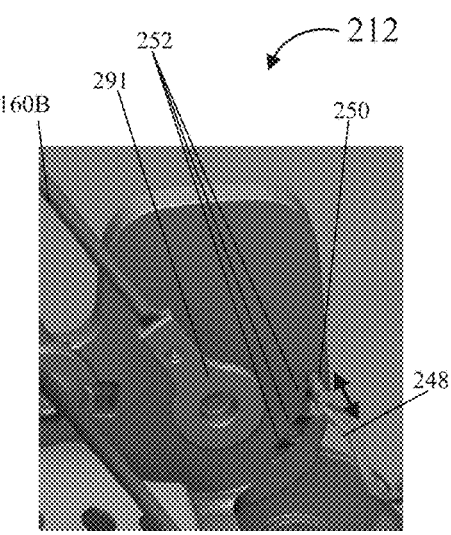

In addition, a carry-cot 230, as shown in FIGS. 11A and 19 can be removably coupled to the stroller frame 100. For example, the carry-cot 230 can include a pair of seat attachment tabs 231 similar to the tab 218 of FIG. 12C provided on the seat 212. These seat attachment tabs 231 can be positioned along opposite left and right sides of the carry-cot 230. Each seat connector 187 can be configured to slidably couple to a corresponding seat attachment tab 231 on the left and right sides of the carry-cot 230. The example carry-cot 230 can include a base 233 having a top surface for placing a child thereon. The carry-cot 230 can also include one or more walls 237 that extend up generally from about the base and extend above the top surface of the base 233. The walls 237 and base 233 can define a cavity 239 for receiving the child therein. The carry-cot 230 can also include a carry handle 232. The carry handle 232 can be coupled, rotatably coupled, and/or removably coupled to the carry-cot 230. In one example, the carry handle 232 can have a first end coupled, rotatably coupled, and/or removably coupled to the one or more side walls 237 of the carry-cot 230 along the left side and a distal second end coupled, rotatably coupled, and/or removably coupled to the one or more side walls 237 of the carry-cot 230 along the opposing right side of the carry-cot 230. In one example, the stroller frame 100 can be folded and unfolded as discussed herein with the carry-cot 230 still attached to the stroller frame 100.

In addition, a child car seat (not shown) can be removably coupled to the stroller frame 100. For example, the child car seat can include a pair of seat attachment tabs similar to the tab 218 of FIG. 12C provided on the seat 212. These seat attachment tabs can be positioned along opposite left and right sides of the child car seat. Each seat connector 187 can be configured to slidably couple to a corresponding seat attachment tab on the left and right sides of the child car seat. The example child car seat can include a seat shell with a seat bottom and a seat back. The child car seat can also include a carry handle. The carry handle can be coupled, rotatably coupled, and/or removably coupled to the child car seat. In one example, the carry handle can have a first end coupled, rotatably coupled, and/or removably coupled to one side of the child car seat along the left side and a distal second end coupled, rotatably coupled, and/or removably coupled to another side of the child car seat along the opposing right side of the child car seat. In one example, the stroller frame 100 can be folded and unfolded as discussed herein with the child car seat still attached to the stroller frame 100.

FIGS. 12A-D are various views of a detachable, reversible seat 212 that can be attached to the stroller frame 100 of FIGS. 11A-D in either a forward-facing or rearward-facing configuration according to one example embodiment of the disclosure. Referring now to FIGS. 11A-12D, each seat 212 can include a seat back 214 and a seat bottom 216 that a child sits upon. The seat back 214 can be rotatably coupled to the seat bottom 216 via one or a pair of seat folding mechanisms 219 positioned along corresponding left and right sides of the seat 212. While not shown, each of the seat back 214 and seat bottom 216 can further include padding and other soft goods (e.g., fabric or other covering materials) to cover all or a portion of each of the seat back 214 and seat bottom 216 and to improve the comfort when sitting in the seat 212.

The seat 212 can also include a seat release mechanism to allow the seat back 214 to fold downward towards the seat bottom 216. The seat release mechanism can include a seat release latch 242. In one example embodiment, the seat release latch 242 can be positioned along a back side of the seat back 214 near the top of the seat back 214. Further, the seat release latch 242 may be a spring-biased hand-pullable latch, button, or trigger that moves upward from a static position to a folding position and is spring-biased into the lower, static position. The seat release latch 242 can be operably coupled to one or more cables or wires 243, 244 at a first end 245, 246 and extend from the seat release latch 242 through corresponding channels 239, 240 along the seat back 214 and to a corresponding distal second end 247, 248, where each corresponding cable or wire 243, 244 can be coupled to a movable latch or pin 250 or other engagement device that can be inserted and removed from one or more seat position cavities 252 disposed along an inner side of each of the corresponding seat folding mechanisms 219, to adjust the seat back 214 and mechanism 219 from the static or locked configuration (wherein rotation about the pivot axis of the seat folding mechanism 219 is prevented) to an unlocked configuration (wherein rotation about the pivot axis of the seat folding mechanism 219 occurs). In one example, each cavity 252 is sized and shaped to slidably receive therein at least a portion of the corresponding movable latch or pin 250. For example, when a user lifts the seat release latch 242, it creates a tension of the corresponding cables 243, 244, that cause the corresponding latch or pin 250 to be pulled out of the corresponding one of the cavities 252 and allows the seat back 214 to be freely rotated with respect to the seat bottom 216. In one example, the seat folding mechanism 219 can include 1 or more seat position cavities 252 for providing differing angles of orientation for the seat back 214 with respect to the seat bottom 216.

The example stroller frame 100 can further include a canopy frame 160. The canopy frame 160 can be rotatably coupled to the handle frame seat folding mechanism 219 via a pair of canopy folding mechanisms 291 disposed along each end of the canopy frame 160. In one example embodiment, the canopy frame 160 can include a corresponding front end 160A, and a pair of arms 160B, each extending from the front end 160A and coupled together via the front end 160A. Alternatively, the arms 160B and front end 160A can be integrally formed as one piece. Each of the arms 160B can be directly or indirectly coupled to a corresponding one of the seat folding mechanisms 219 via a canopy folding mechanism 291 to allow the canopy frame 160 to rotate independently with respect to the seat 212 and the stroller frame 100 along multiple positions. The canopy frame 160 can be made from metal or plastic solid or tubular material. Further, all or at least a portion of the canopy frame 160 can be covered in soft goods or other fabric material to provide a shade over the seating area of the stroller frame 100 or the seat 212.

The example seat 212 and stroller frame 100 can further include a belly bar 162. In one example embodiment, the belly bar 162 is removably coupled to the seat 212 adjacent the seat folding mechanism 219. In another example embodiment, the belly bar 162 is rotatably coupled to the seat 212 adjacent the seat folding mechanism 219. The belly bar 162 can include a front member having a first end and a distal second end. A first side member can be coupled to and extend from or be integrally formed with the first end of the front member. In one example, the first side member can have a longitudinal axis that extends in a direction orthogonal or substantially orthogonal to the longitudinal axis of the front member. The belly bar 162 can also include a second side member that is coupled to and extends from or is integrally formed with the second end of the front member. In one example, the second side member can have a longitudinal axis that extends in a direction orthogonal or substantially orthogonal to the longitudinal axis of the front member and parallel or substantially parallel to the longitudinal axis of the first side member. In one example, all or a portion of the belly bar 162 can be covered with soft goods, padding, and/or other fabric or plastic material.

The belly bar 162 can be rotatably coupled to the seat 212 along a distal end of the first side member of the belly bar 162 via a first belly bar folding mechanism 220 and along a distal end of the second side member of the belly bar 162 via a second belly bar folding mechanism 220. Each of the belly bar folding mechanisms can be positioned adjacent the corresponding seat folding mechanism 219. The belly bar 162 can be configured to rotate about an axis that is parallel or substantially parallel to the axis of rotation of the seat 212 and the canopy member 160.

In an alternative embodiment, the length of extension of the belly bar 162 can be adjusted in relation to the seat folding mechanism 219 by providing each of the first side member and second side member of the belly bar 162 with telescoping members that can be extended and retracted to different lengths, making the length of each of the first side member and second side member manually adjustable from a first length to a second length greater than the first. In one example, the first side member and the second side member of the belly bar 162 can each be constructed of two or more telescoping members such that each of the first side member and second side member can be manually adjusted from a first position having a first length to a second position having a second length, wherein the second length is greater than the first length and wherein the first side member and second side member are longer in the second position than in the first position. Each of the minor telescoping portions of the first side member and second side member can further include an adjustable latching mechanism that operatively couples to a corresponding latching mechanism positioned in an outer wall of one or more of the major telescoping portions of the first side member and second side member (e.g., the one or more minor telescoping portions of each side member being configured to be slidably received into an interior passageway of each of one or more of the major telescoping portions of each side member). A release button (not shown) may then be operatively coupled (e.g., via one or more cables) to the adjustable latching mechanism(s) to release the latching mechanism when the user wants to adjust the length of the first side member and second side member. One example of an adjustable latching mechanism is a spring-loaded ball or pin and a corresponding detent or aperture for receiving the spring-loaded ball or pin to hold the side members in a stationary position. Further, the first side member and second side member may be telescoping and manually adjustable between more than a first and second position.

FIGS. 13A-C are various partial views of one of a pair of the seat folding mechanisms 219 for the reversible seat 212 and belly bar 162 of the stroller frame 100 according to one example embodiment of the disclosure. The two example seat folding mechanisms 219 can be positioned adjacent a side edge of the seat 212 when the seat 212 is coupled to the stroller frame 100. While the example embodiment shown and described with reference to FIGS. 13A-C shows one of the seat folding mechanisms 219 positioned along a right edge of the seat 212, it is understood that a second, substantially similar seat folding mechanism 219 can be provided along the opposite (left) edge of the seat 212. Referring to FIGS. 11A-13C, the seat folding mechanism 219 can include a base housing 302 having a planar or substantially planar side surface 303. In one example, the planar side surface 303 is positioned along an inner, exterior (i.e. the seat 212 is positioned between the opposing facing planar side surfaces 303 of the two seat folding mechanisms 219. The base housing 302 can also include a cut-out or recess opening 308 disposed along one edge of the side surface 303 and defining a belly bar rotation stop cavity 308. In one example, the recess opening 308 can be positioned along the forward edge 305 of the base housing 302.

A rotation cam member 304 can be coupled to the seat 212 and rotatably coupled to the seat folding mechanism 219. In one example, the rotation cam member 304 is positioned along and coupled to a side edge of the seat back 214 and along the planar side surface 303 of the housing 302. In one example, the rotation cam member 304 can slidably rotate along the side surface 303. The rotation cam member 304 can include an outer edge 306 that has a variable radius (from the axis of rotation A14 of the rotation cam member 304) about the circumference of the outer edge 306. In one example, the radius of the outer edge 306 (when measured in the direction from the axis of rotation A14 of the rotation cam member 304 to the axis of rotation A15 of the belly bar 162) is less when the seat 212 is in the in-use configuration than when the seat 212 is in the folded configuration as the cam member is rotated in the direction R3.

The belly bar 162 can be rotatably coupled to seat folding mechanism 219. For example, one of the first and second side members of the belly bar 162 can be removably coupled to a belly bar rotation housing 310. In one example, one of the first and second side members of the belly bar 162 can be slidably inserted into the belly bar rotation housing 310 and the rotation housing 310 can be rotatably coupled to a belly bar folding mechanism 313 for rotating about the axis of rotation A15. The belly bar rotation housing 310 can include a hub 311 positioned along one end of the belly bar rotation housing 310. In one example, the hub 311 can have a substantially cylindrical shape. The belly bar rotation housing 310 can also include an opening 315 along an outer perimeter of the hub 311 and extending radially inward. The belly bar rotation housing can operatively engage the belly bar folding mechanism 313.

The belly bar folding mechanism 313 can include a locking member 314. In one example, the locking member 314 is a latch. Further, the locking member 314 can be spring-biased radially outward from the axis of rotation A15 and towards the axis of rotation A14 of the rotation cam member 304. The locking member 314 can include a tab 317 configured to be movably received into one or both of the recess/opening 308 in the base housing 302 and the opening 315 along the outer perimeter of the hub 311. The tab 317 can extend up orthogonally or substantially orthogonally from an outer surface of the locking member 314 and can extend inwardly (toward the seat bottom 216) to a height greater than the edges of the recess/opening 308 in the base housing 302 and the opening 315 in the hub 311.

For example, when the recess/opening 308 in the base housing 302 and the opening 315 in the hub 311 are aligned, the spring biasing of the locking member 314 can cause the locking member 314 to move the tab 317 from the opening 315 in the hub 311 into the recess/opening 308 in the base housing 302 and preventing rotation of the hub 311 and the belly bar 162 attached thereto. On the other hand, when a user folds the seat back 214 of the seat 212 from an open, in-use configuration towards the folded configuration, it causes the rotation cam member 304 to rotate about the axis of rotation A14 in the direction R3. Rotating about the axis of rotation A14 in the direction R3 increases the radius of the outer edge 306 of the cam member 304 in the direction of the axis of rotation A15 of the belly bar rotation housing 310. The outer edge 306 of the cam member 304 contacts the tab 317 and further rotation of the cam member 304 that further increases the radius causes the outer edge 306 to push the tab 317 out of the recess/opening in the base housing 302 and into the opening 315 of the hub 311, thereby releasing the belly bar rotation housing 310 and allowing it to rotate about the axis of rotation A15 in the direction R2. Thus, the folding of the seat back 214 from an open, in-use configuration to a folded configuration also automatically causes the belly bar to release and be folded from an in-use configuration to a folded configuration.

The front wheel frame 110, the rear wheel frame 120, and the handle frame 130 are rotatably connected to one-another by a pair of frame folding mechanisms 140 and rotate relative to each other from the folded, storage configuration to the unfolded, in-use configuration (as shown in FIG. 11A. In certain example embodiments of the stroller frame 100, each of the handle frame folding mechanisms 150 may be used to rotate the corresponding (e.g., left or right) upper handle frame 131 relative to the corresponding (e.g., left or right) lower handle frame 132 in either the clockwise or counterclockwise direction about the pivot axis of the handle frame folding mechanism 150. In one example, each of the upper handle frame members 131 may be folded to a compact folded handle configuration wherein the corresponding longitudinal axis of the upper handle frame 131 and longitudinal axis of the lower handle frame 132 are substantially parallel to each other. As used herein, the term "substantially parallel" means "within 20 degrees of a true parallel position" in its most compact position.

Figure 11B:
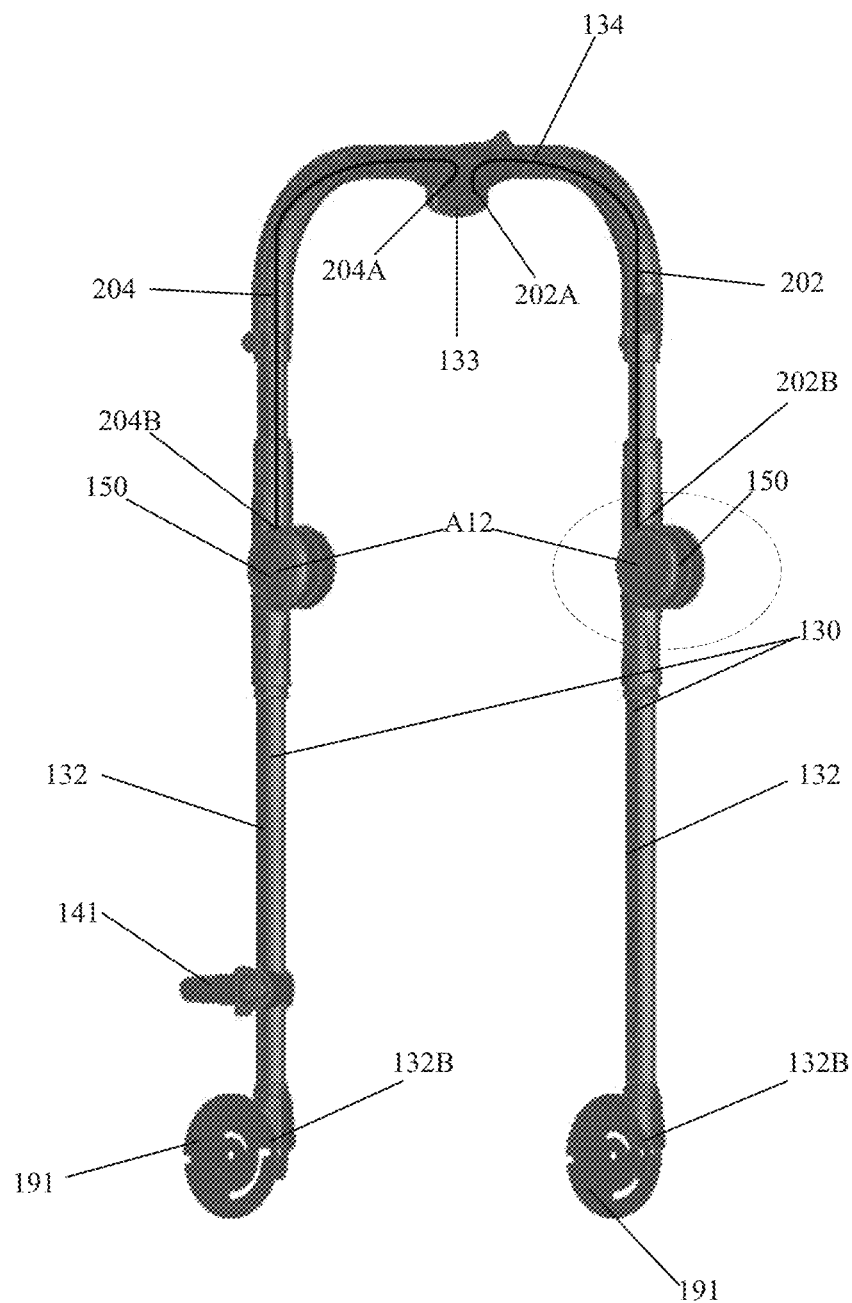
Figure 11C:
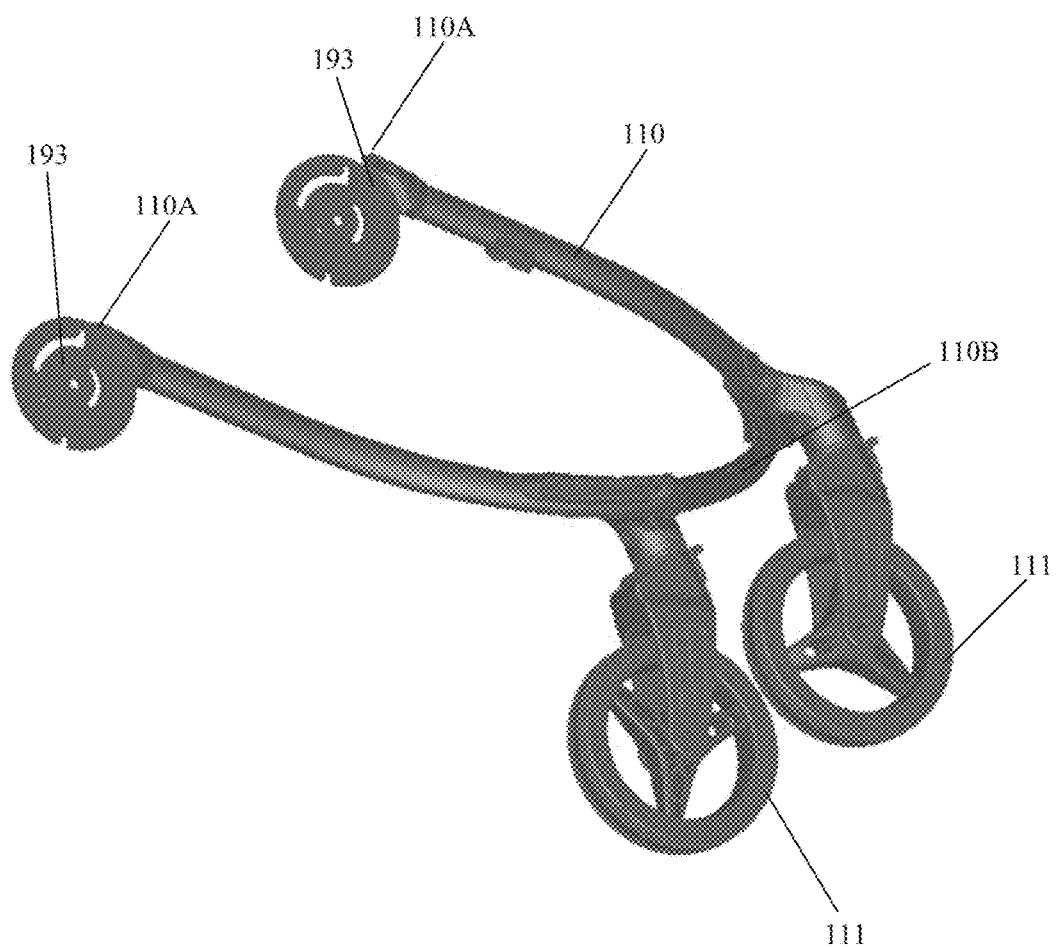
Figure 11D:
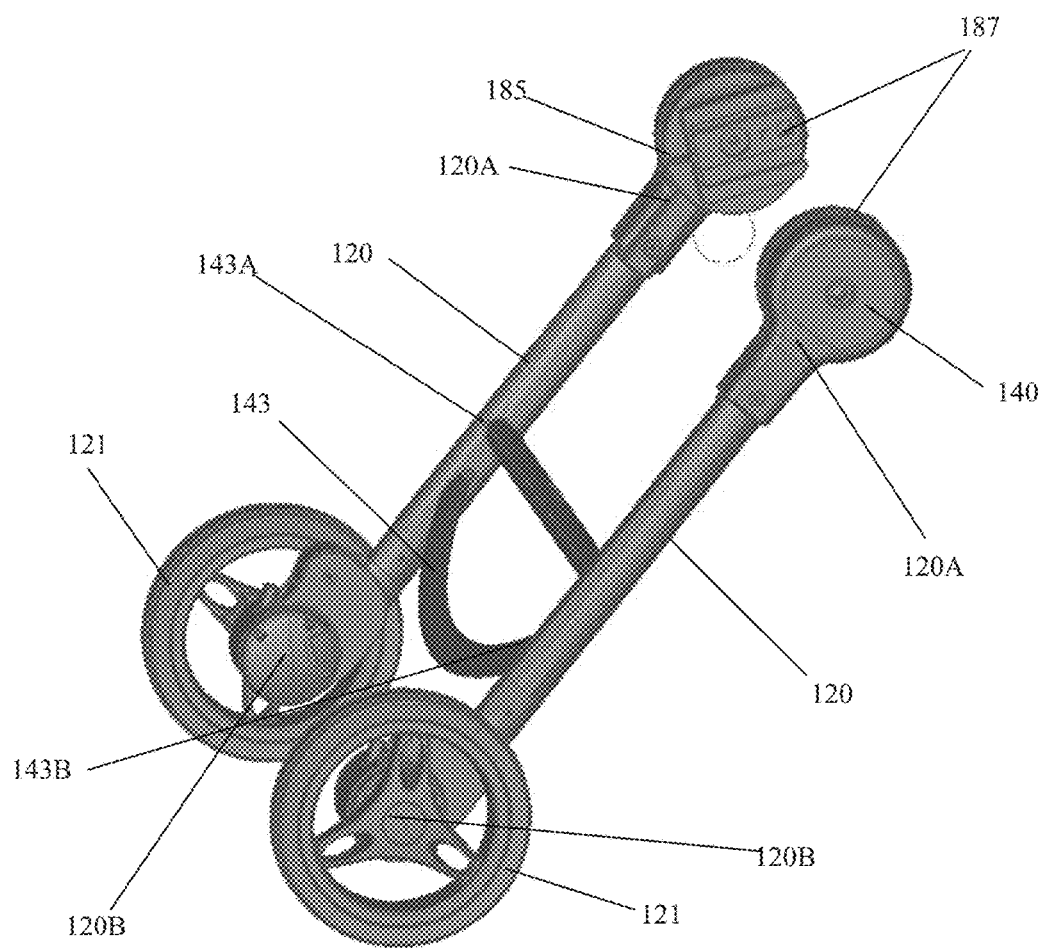

For example, as shown in FIGS. 11A and 11B, the upper handle frame 131 (and its longitudinal axis) are presented in a substantially linear orientation with the lower handle frame 132 (and its longitudinal axis) and the front wheel frame 110. From this substantially linear position, the upper handle frame 131 may be rotated in the counterclockwise or the clockwise direction (relative to the view of FIG. 11A) around a pivot axis in the handle frame folding mechanism 150 approximately 150-180 degrees such that the upper handle frame 131 would be adjacent to the lower handle frame 132 (see FIG. 17C). The handle frame folding mechanism 150 may include a lock or stop to retain the upper handle frame 131 and the lower handle frame 132 in the substantially parallel handle frame folded configuration (as shown in FIG. 17C). With the handle frame 130 in its folded configuration, the frame folding mechanism 140 may be unlocked and the handle frame 130, front wheel frame 110, and the rear wheel frame 120 may be rotated relative to each other into the folded storage configuration of the stroller 100. Alternatively, the order of use of each folding mechanism 140, 150 may be reversed. Example embodiments of the folding mechanisms 140, 150 are described in U.S. Pat. Nos. 7,632,035; 6,095,548; 6,105,998; 6,991,248; and 6,102,431, the entire contents of each of which are hereby incorporated herein by reference for all purposes.

In this or other example embodiments, the handle frame folding mechanism 150 may also include one or more stops between the linear position of the upper frame member 131 and the lower frame member 132 (shown in FIG. 11A) and handle frame folded position configuration (shown in FIG. 17C). The one or more stops (not shown) can allow the height of the upper handle frame 131 near the first end 131A to be adjusted relative to the ground level or surface that the wheels 111, 121 of the stroller frame 100 are rolling on. The adjustment of the height of the upper handle frame 131 can accommodate the different heights of the user and/or the different heights that each user desires the handle to be at when pushing the stroller frame 100. The example stops may be used to adjust the height of the first end 131A of the upper handle frame 131 in any desired increments.

For example, each stop may be used to adjust the height of the first end 131A of the upper handle frame 131 in a number of positions above and/or below the linear position. For example, with reference to FIG. 1A, the upper handle frame 131 may rotate relative to the lower handle frame 132 clockwise such that the handle grip portion 134 of the stroller frame 100 along the first end 131A is raised in height in 0.5 to 2 inch increments with the use of the different stops in the handle frame folding mechanism. In addition or in the alternative, the upper handle frame 131 may rotate relative to the lower handle frame 132 counterclockwise such that the handle grip portion 134 of the stroller frame 100 along the first end 131A is lowered in height in 0.5 to 2 inch increments to lower the first end 131A of the upper handle frame 131. Further, the handle folding mechanism 150 can include a multitude of stops that fix the first end 131A of the upper handle frame 131 at various heights at a position within 30 degrees on either side of the linear position and may also rotate without any further stop positions to the folded configuration shown in FIG. 17C.

Thus, in certain example embodiments, the handle frame folding mechanism 150 allows rotation of the upper handle frame 131 from a position adjacent to and substantially parallel to the lower handle frame 132 to a position past the relative linear position (as shown in FIG. 11A) of the lower handle frame 132 and the upper handle frame 131. In certain example embodiments, the upper handle frame 131 can be rotated about the pivot axis of the handle frame folding mechanism 150 from a position adjacent to and substantially parallel to the lower handle frame handle 132 to a position past the relative linear position (as shown in FIG. 1A) of the lower handle frame 132 and the upper handle frame 131 to a position wherein the upper handle frame 131 is substantially parallel to a plane of the ground or other surface. As used herein, the "plane of the ground" is defined by the bottom of the wheels 111, 121 in contact with the surface on which the stroller frame 100 is rolling or resting.

In certain example embodiments the combined linear distance of the upper handle frame 131, from the first end 131A to the second end 131B, and the second linear distance of the lower handle frame 132, from the first end 132A to the second end 132B, is approximately twice as long as either the linear distance of the front wheel frame 110, from the first end 110A to the second end 110B, the linear distance of each of the rear wheel frames 120, from the first end 120A to the second end 120B, or both. However, the upper handle frame 131 is rotatably coupled to the lower handle frame 132 via the handle folding mechanism 150. That allows the handle frame 130 to be folded such that the length of the handle frame 130 in the folded configuration is approximately the same length as linear distance of the front wheel frame 110, the rear wheel frame 120 or both the front wheel frame 110, and rear wheel frame 120.

For example, in order to provide a more compact folded configuration for the stroller frame 100, each of the major frame members (the upper handle frame 131, the lower handle frame 132, the front wheel frame 110 and the rear wheel frame 120) should have substantially equivalent lengths. As used herein, the four major frame members have "substantially equivalent lengths" if the length of each of the major frame members 131, 132, 110, and 120 is within 25% of the average of the lengths of the major frame members 131, 132, 110, and 120. In other example embodiments, the lengths of the four major frame members 131, 132, 110, and 120 are within 10% of the average of the lengths of the major frame members 131, 132, 110, and 120. The lengths of each of the major frame members 131, 132, 110, and 120 can be determined in substantially the same manner as for the major frame members 31, 32, 10, and 20 of the stroller frame 1, as shown in FIG. 1C.

The lengths of the major frame members 131, 132, 110, and 120 are measured from their respective rotational axes of the folding mechanisms 140, 150. For example, as shown in FIG. 1C, the length L10 of the front wheel frame 10 (and similarly the front wheel frame 110) is measured from the rotational axis A1 of the frame folding mechanism 40 along a line to the rotational axis WI of the front wheel 11. The length L20 of the rear wheel frame 20 (and similarly the rear wheel frame 120) is measured from the rotational axis A1 of the frame folding mechanism 40 along a line to the rotational axis W2 of the rear wheel 21. The length L32 of the lower handle frame 32 (and similarly the lower handle frame 132) is measured from the rotational axis A1 of the frame folding mechanism 40 along a line to the rotational axis A2 of the handle frame folding mechanism 50. The length of the upper handle frame 31 (and similarly the upper handle frame 131) is measured from the end of the handle grip 34 along a line to the rotational axis A2 of the handle frame folding mechanism 50. In one example, the upper handle frame 131 and the lower handle frame 132 have substantially equal lengths (within 10%, for example).

Similar to that shown and described in FIGS. 5A-C, the stroller frame 100 of FIGS. 11A-D can also include a frame lock latch and a frame lock latch receiver for the stroller frame 100. The frame lock latch 141 can be coupled to either the handle frame 130 or the front wheel frame 110. In one example embodiment, the frame lock latch 141 can be coupled to either the handle frame 130 (e.g., the lower handle frame 132) or the front wheel frame 110 adjacent the frame folding mechanism 140. The frame lock latch 141 can include a member having a first end coupled to the frame 100 and a distal, free second end and a longitudinal axis that extends between the first and second ends. The frame lock latch 141 can also include an engagement tab coupled at or near the second, free end of the member and extending orthogonally or substantially orthogonally to the longitudinal axis of the member. In certain example embodiments, the frame lock latch 141 can be rotatably coupled to either the lower handle frame 132 or the front wheel frame 110 and configured to be rotated from a storage position, where the longitudinal axis of the member is parallel to the longitudinal axis of the frame member 132 or 110 to which it is rotatably coupled, to a use position.

The folding stroller frame 100 can also include a frame lock latch receiver coupled to the other one of the handle frame 130 and the front wheel frame 110 that the frame lock latch 141 is not coupled to. The frame lock latch receiver can be coupled to the other one of the handle frame (e.g., the lower handle frame 132) and the front wheel frame 110 adjacent the frame folding mechanism 140 and on an opposite side of the frame folding mechanism 140 from the frame lock latch 141. The frame lock latch receiver can include a receiving area for receiving and coupling to the engagement tab of the frame lock latch 141. In one example embodiment, the receiving area can include a detent, such as a recessed portion surrounded or at least partially surrounded by a raised portion, that is configured to receive at least a portion of the engagement tab in the recessed portion of the frame lock latch receiver (see FIG. 5B for example).

FIG. 11B shows the frame lock latch 141 in the use position while the stroller frame 100 is in the unfolded, in-use configuration. FIGS. 5B-C show the engagement tab engaging the detent and coupling the frame lock latch 41 (and similarly 141) to the frame lock latch receiver 42 when the folding stroller frame 1 (and similarly stroller frame 100) is in the folded, storage configuration. The coupling of the frame lock latch 141 with the frame lock latch receiver helps to hold the frame members 130, 120, and 110 together when the stroller frame 100 is in the folded, storage configuration.

FIGS. 17A-E are a pictorial representation of a method for folding the stroller frame of FIGS. 11A-16B with the seat attached in a forward-facing configuration according to one example embodiment of the disclosure. Now referring to FIGS. 11A-17E, FIG. 17A shows the stroller frame 100 with the seat in the forward-facing position and the stroller in the in-use configuration. To begin the example folding process, the user can lift the seat release latch 242, which creates a tension of the corresponding cables 243, 244, that causes the corresponding latch or pin 250 along each side edge of the seat 212 to be pulled out of the corresponding one of the cavities 252 and allows the seat back 214 to be freely rotated with respect to the seat bottom 216 in the direction R10, as shown in FIG. 17B. When the user begins to folds the seat back 214 of the seat 212 from an open, in-use configuration towards the folded configuration in the direction R10, it causes the rotation cam member 304 to rotate about the axis of rotation A14 in the direction R3. Rotating about the axis of rotation A14 in the direction R3 increases the radius of the outer edge 306 of the cam member 304 in the direction of the axis of rotation A15 of the belly bar rotation housing 310. The outer edge 306 of the cam member 304 contacts the tab 317 and further rotation of the cam member 304 that further increases the radius causes the outer edge 306 to push the tab 317 out of the recess/opening in the base housing 302 and into the opening 315 of the hub 311, thereby releasing the belly bar rotation housing 310 and allowing the belly bar rotation housing 310 to rotate about the axis of rotation A15 in the direction R2 and allowing the belly bar 162 to also rotate in the direction R10 with the seat back 214. Thus, the folding of the seat back 214 from an open, in-use configuration to a folded configuration also automatically causes the belly bar 162 to release and be folded from an in-use configuration to a folded configuration as shown in FIG. 17B.

Next, as shown in FIG. 17C, the folding method can include the user squeezing the latch 133 along the handle grip portion 134. As the user squeezes the latch 133 it creates a tension in each of the cables 202, 204, and the second end 202B, 204B of the cable 202, 204 is pulled up towards the handle grip portion 134, which pulls the handle retaining pin within each of the handle frame folding mechanisms 150 and unlocks the handle frame folding mechanisms 150. This allows the upper handle frame 131 to rotate about the pivot axis A12 in the direction R11 as shown in FIG. 17C.

As the upper handle frame 130 is rotated in the direction R11, a portion of the upper handle frame folding mechanism 150 moves the release pin 402 from a frame lock position to a frame release position by contacting and pushing the frame release pin 402 in the direction D5 in each of the handle frame folding mechanisms 150. As the portion of the handle frame folding mechanism 150 contacts the pin 402 and causes the pin 402 to move in the direction D5, movement of the pin 402 in direction D5 creates tension on the pin mounting member 502 that overcomes the spring force of the spring-biasing member 504 and causes the frame hinge latch release member 510 to be pulled in the direction D6. Movement of the member 510 in the direction D6, which can be the same direction as D5, causes the bottom edge 520 of the member 510 to slide along the frame folding mechanism release pin 530. When the release pin 530 enters into the notch or recess 514, because spring-biasing of the release pin 530 causes the release pin 530 to move in the direction D7, it unlocks the frame folding mechanism 140 from a locked configuration and allows the lower handle frames 132, front wheel frames 110, and rear wheel frames 120 all to be able to rotate with respect to one-another for each of the frame folding mechanisms 140. As shown in FIG. 17D, once the frame folding mechanism 140 is unlocked, the lower handle frames 132 can rotate in the direction R12 due to gravity.

In addition, movement of the member 510 in the direction D6 causes the seat rotation control member 606 to be moved in the direction D8. Once the seat rotation control member 606 moves far enough in the direction D8 that the rotation stop tab 185 is no longer within the channel or slot 608, the seat attachment plate 602 and the seat 212 attached thereto are free to rotate in the direction R13 due to gravity as shown in FIG. 17E. With the seat attachment plate 602 free to rotate and the lower handle frames 132, front wheel frames 110, and rear wheel frames 120 all able to rotate freely with respect to one-another for each of the frame folding mechanisms 140, the user can then grab the stroller frame 100 by a handle 702 positioned along the back end of the seat bottom 216 and lift the stroller frame 100 vertically in the direction D10. This will allow the front wheel frames 110 and seat 212 to rotate in the direction R17 and the rear wheel frames 120 and lower handle frames 132 to rotate in the direction R18 towards the front wheel frames 110 and seat 212. The result is the combined seat 212 and stroller frame 100 in a folded configuration similar to that shown in FIG. 2, where the longitudinal axes of the upper handle frames 131, lower handle frames 132, front wheel frames 110, rear wheel frames 120, seat back 214 and seat bottom 216 are parallel or substantially parallel to one another. This allows for an extremely compact fold of the stroller frame 100 and seat 212 that meets the carry on requirements of the International Air Transportation Association guidelines for cabin baggage dimensions (56×46×25 cm, or 22×18×10 in).

Figure 18A:
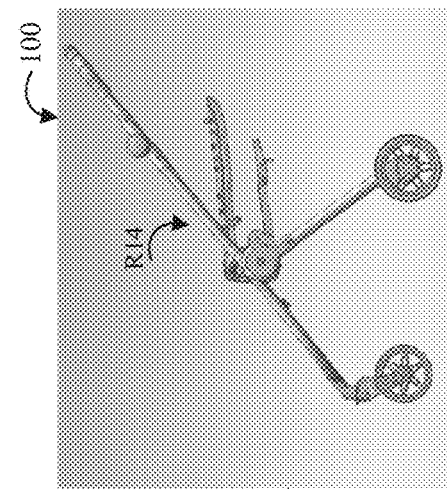
Figure 18B:
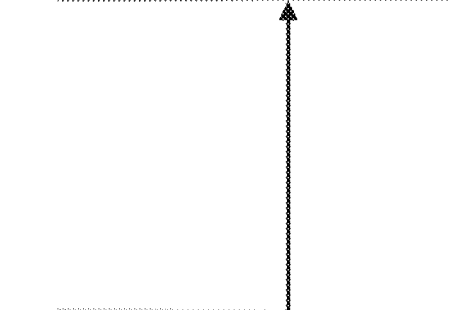

FIGS. 18A-D are a pictorial representation of another method for folding the stroller frame of FIGS. 11A-16B with the seat attached in a rear-facing configuration according to one example embodiment of the disclosure. Now referring to FIGS. 11A-16B and 18A-D, FIG. 18A shows the stroller frame 100 with the seat 212 in the rear-facing position and the stroller frame 100 in the in-use configuration. To begin the example folding process, the user can lift the seat release latch 242 along the seat back 214, which creates a tension of the corresponding cables 243, 244, that causes the corresponding latch or pin 250 along each side edge of the seat 212 to be pulled out of the corresponding one of the cavities 252 and allows the seat back 214 to be freely rotated with respect to the seat bottom 216 in the direction R14 towards the handle grip portion 134, as shown in FIG. 18B. When the user begins to folds the seat back 214 of the seat 212 from an open, in-use configuration towards the folded configuration in the direction R14, it causes the rotation cam member 304 to rotate about the axis of rotation A14 in the direction R3. Rotating about the axis of rotation A14 in the direction R3 increases the radius of the outer edge 306 of the cam member 304 in the direction of the axis of rotation A15 of the belly bar rotation housing 310. The outer edge 306 of the cam member 304 contacts the tab 317 and further rotation of the cam member 304 that further increases the radius causes the outer edge 306 to push the tab 317 out of the recess/opening in the base housing 302 and into the opening 315 of the hub 311, thereby releasing the belly bar rotation housing 310 and allowing the belly bar rotation housing 310 to rotate about the axis of rotation A15 in the direction R2 and allowing the belly bar 162 to also rotate in the direction R14 with the seat back 214. Thus, the folding of the seat back 214 from an open, in-use configuration to a folded configuration also automatically causes the belly bar 162 to release and be folded from an in-use configuration to a folded configuration as shown in FIG. 18B.

Figure 18C:
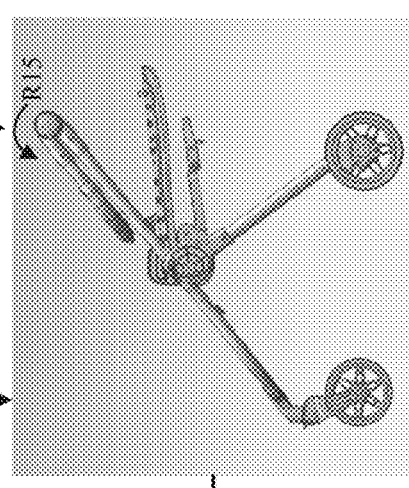

Next, as shown in FIG. 18C, the folding method can include the user squeezing the latch 133 along the handle grip portion 134. As the user squeezes the latch 133, it creates a tension in each of the cables 202, 204, and the second end 202B, 204B of the cable 202, 204 is pulled up towards the handle grip portion 134, which pulls the handle retaining pin within each of the handle frame folding mechanisms 150 and unlocks the handle frame folding mechanisms 150. This allows the upper handle frame 131 to rotate about the pivot axis A12 in the direction R15 as shown in FIG. 18C.

Figure 18D:
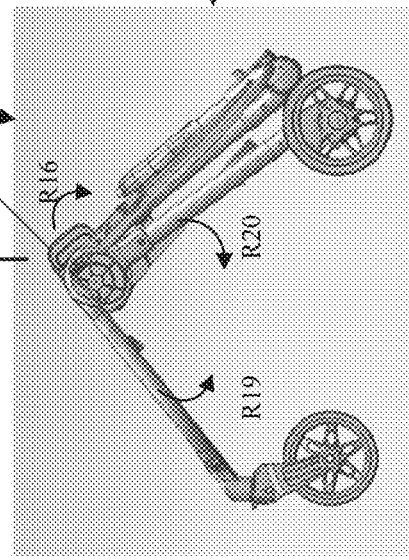

As the upper handle frame 130 is rotated in the direction R15, a portion of the upper handle frame folding mechanism 150 moves the release pin 402 from a frame lock position to a frame release position by contacting and pushing the frame release pin 402 in the direction D5 in each of the handle frame folding mechanisms 150. As the portion of the handle frame folding mechanism 150 contacts the pin 402 and causes the pin 402 to move in the direction D5, movement of the pin 402 in direction D5 creates tension on the pin mounting member 502 that overcomes the spring force of the spring-biasing member 504 and causes the frame hinge latch release member 510 to be pulled in the direction D6. Movement of the member 510 in the direction D6, which can be the same direction as D5, causes the bottom edge 520 of the member 510 to slide along the frame folding mechanism release pin 530. When the release pin 530 enters into the notch or recess 514, because spring-biasing of the release pin 530 causes the release pin 530 to move in the direction D7, it unlocks the frame folding mechanism 140 from a locked configuration and allows the lower handle frames 132, front wheel frames 110, and rear wheel frames 120 all to be able to rotate with respect to one-another for each of the frame folding mechanisms 140. As shown in FIG. 18D, once the frame folding mechanism 140 is unlocked, the lower handle frames 132 can rotate in the direction R16 due to gravity.

In addition, movement of the member 510 in the direction D6 causes the seat rotation control member 606 to be moved in the direction D8. Once the seat rotation control member 606 moves far enough in the direction D8 that the rotation stop tab 185 is no longer within the channel or slot 608, the seat attachment plate 602 and the seat 212 attached thereto are free to rotate in the direction R16 due to gravity as shown in FIG. 18D.

With the seat attachment plate 602 free to rotate and the lower handle frames 132, front wheel frames 110, and rear wheel frames 120 all able to rotate freely with respect to one another for each of the frame folding mechanisms 140, the user can then grab the stroller frame 100 by a handle 702 positioned along the back end of the seat bottom 216 and lift the stroller frame 100 vertically in the direction D11. This will allow the front wheel frames 110 to rotate in the direction R19 and the rear wheel frames 120, seat 212, and lower handle frames 132 to rotate in the direction R20 towards the front wheel frames 110. The result is the combined seat 212 and stroller frame 100 in a folded configuration similar to that shown in FIG. 2, where the longitudinal axes of the upper handle frames 131, lower handle frames 132, front wheel frames 110, rear wheel frames 120, seat back 214 and seat bottom 216 are parallel or substantially parallel to one another. This allows for an extremely compact fold of the stroller frame 100 and seat 212 that meets the carry on requirements of the International Air Transportation Association guidelines for cabin baggage dimensions (56×46×25 cm, or 22×18×10 in).

Although example embodiments of the disclosure have been described, one of ordinary skill in the art will recognize that numerous other modifications and alternative embodiments are within the scope of the disclosure. Furthermore, while various example implementations and architectures have been described in accordance with example embodiments of the disclosure, one of ordinary skill in the art will appreciate that numerous other modifications to the example implementations and architectures described herein are also within the scope of this disclosure.

Certain aspects of the disclosure are described above with reference to example methods of use of the foldable stroller frame. It will be understood that one or more steps of the described example methods may not necessarily need to be performed in the order presented, or may not necessarily need to be performed at all, according to some embodiments. Further, additional components and/or operations beyond those depicted in example methods may be present in certain embodiments.

Although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, and/or steps. Thus, such conditional language is not generally intended to imply that features, elements, and/or steps are in any way required for one or more embodiments.

What is claimed is:
1. A stroller, comprising:
  a stroller frame comprising:
    a handle frame comprising:
      at least one upper handle frame;
      a first lower handle frame;
      a second lower handle frame;
      a first handle frame folding mechanism rotatably connecting the at least one upper handle frame to the first lower handle frame; and
      a second handle frame folding mechanism rotatably connecting the at least one upper handle frame to the second lower handle frame;
      a latch release member disposed within the first lower handle frame and operably coupled to the first handle frame folding mechanism;
    a front wheel frame;
    a rear wheel frame;
    a first frame folding mechanism rotatably connecting the first lower handle frame, the front wheel frame, and the rear wheel frame and comprising a fold release pin contacting the latch release member and configured to be moved by the latch release member from a locked position, wherein rotation of one or more of the first lower handle frame, the front wheel frame, and the rear wheel frame about a rotation axis of the first frame folding mechanism is prevented, to an unlocked position, wherein rotation of one or more of the first lower handle frame, the front wheel frame, and the rear wheel frame about the rotation axis of the first frame folding mechanism occurs; and a second frame folding mechanism rotatably connecting the second lower handle frame, the front wheel frame and the rear wheel frame;
a first seat attachment plate rotatably coupled to the stroller frame and configured to attach a portion of a seat or carry-cot to the stroller frame;
a second seat attachment plate rotatably coupled to the stroller frame and configured to attach a second portion of a seat or carry-cot to the stroller frame,
wherein rotation of the at least one upper handle frame folding mechanism about the first and second handle frame folding mechanisms from an in-use position towards a folded position causes the latch release member to move the fold release pin from the locked to the unlocked position.

2. The stroller of claim 1, wherein the stroller further comprises a stroller seat coupled to the first attachment plate and the second attachment plate, the stroller seat configured to rotate in a first direction and an opposing second direction with respect to the stroller frame, the stroller seat comprising:
a seat bottom; and
a seat back rotatably coupled to the seat bottom, wherein the seat back rotates with respect to the seat bottom about a first axis from a first in-use configuration to a first folded configuration.

3. The stroller of claim 2, wherein the stroller seat further comprises:
a first seat folding mechanism disposed along a first lateral side of the stroller seat, the first seat folding mechanism comprising a first portion coupled to the first seat attachment plate, a second portion coupled to the seat back, and a third portion coupled to the seat bottom; and
a second seat folding mechanism disposed along a second lateral side of the stroller seat opposite the first lateral side, the second seat folding mechanism comprising a fourth portion coupled to the second seat attachment plate, a fifth portion coupled to the seat back, and a sixth portion coupled to the seat bottom.

4. The stroller of claim 3, further comprising a belly bar comprising a first end rotatably coupled to the first seat folding mechanism, and a distal second end rotatably coupled to the second seat folding mechanism, wherein the belly bar rotates about a second axis and wherein the first axis and the second axis are substantially parallel.

5. The stroller of claim 4, wherein the belly bar is configured to automatically rotate from a second use position to a second folded position upon rotation of the seat back from the first in-use configuration to the first folded configuration.

6. The stroller of claim 5, wherein the first seat folding mechanism comprises:
a first belly bar rotation mechanism comprising a first locking tab movable from a locked position to an unlocked position, wherein in the locked position, the belly bar is prevented from rotating about the second axis and in the unlocked position the belly bar is configured to freely rotate about the second axis;
a first seat rotation cam coupled to the seat back and rotatably coupled to the first seat folding mechanism, wherein the first seat rotation cam has a variable radius; wherein the first seat rotation cam is configured to rotate about the first axis and an outer perimeter of the first seat rotation cam is configured to contact the first locking tab and move the first locking tab from the locked to the unlocked position.

7. The stroller of claim 1, wherein the first handle frame folding mechanism and the second handle frame folding mechanism are configured to adjust the at least one upper handle frame, the first lower handle frame, and the second lower handle frame from an in-use, extended position to a folded, storage position, wherein in the folded, storage position the at least one upper handle frame is disposed alongside the first lower handle frame and the second lower handle frame and a longitudinal axis of the at least one upper handle frame is substantially parallel to a longitudinal axis of each of the first lower handle frame and the second lower handle frame.

8. The stroller of claim 1, wherein the first handle frame folding mechanism is operably coupled to a first release mechanism for the first frame folding mechanism, wherein the second handle frame folding mechanism is operably coupled to a second release mechanism for the second frame folding mechanism, and wherein the first and second frame folding mechanisms are configured to be adjusted from a locked configuration to an unlocked configuration by rotation of the at least one upper handle frame folding mechanism about the first and second handle frame folding mechanisms from an in-use position towards a folded position.

9. The stroller of claim 1, wherein the lower handle frame, the upper handle frame, the front wheel frame and the rear wheel frame have substantially equivalent lengths.

10. The stroller of claim 1, further comprising:
a handle grip portion disposed along an end of the upper handle frame;
a handle folding mechanism latch disposed at least partially within the handle grip portion and operably coupled to the handle frame folding mechanism, wherein the handle frame folding mechanism latch is configured to release the handle frame folding mechanism from a locked configuration.

11. The stroller of claim 1, wherein the stroller further comprises one of the seat or the carry cot removably coupled to the first seat attachment plate and the second seat attachment plate.

12. A method of adjusting a stroller from an in-use configuration to a folded configuration comprising:
providing a stroller comprising:
a handle frame comprising:
at least one upper handle frame;
a first lower handle frame;
a second lower handle frame;
a first handle frame folding mechanism rotatably connecting the at least one upper handle frame to the first lower handle frame; and
a second handle frame folding mechanism rotatably connecting the at least one upper handle frame to the second lower handle frame;
a front wheel frame;
a rear wheel frame;
a first frame folding mechanism rotatably connecting the first lower handle frame, the front wheel frame, and the rear wheel frame; and
a second frame folding mechanism rotatably connecting the second lower handle frame, the front wheel frame and the rear wheel frame;
a first seat attachment plate rotatably coupled to the stroller frame;
a second seat attachment plate rotatably coupled to the stroller frame; and
a stroller seat coupled to the first seat attachment plate and the second seat attachment plate;

rotating the at least one upper handle frame about a first pivot axis of the first handle frame folding mechanism and the second handle frame folding mechanism to position the upper handle frame substantially parallel with the lower handle frame;

automatically adjusting the first frame folding mechanism and the second frame folding mechanism from a first locked configuration to a first unlocked configuration in response to the rotation of the upper handle frame from the extended configuration towards the folded configuration; and automatically adjusting the first seat attachment plate and the second seat attachment plate from a second locked configuration to a second unlocked configuration in response to the rotation of the upper handle frame from the extended configuration towards the folded configuration; wherein in the second unlocked configuration, the stroller seat rotates freely about a third pivot axis of the first seat attachment plate and the second seat attachment plate in a first direction and a second direction opposite the first direction.

13. The method of claim 12, wherein in the first unlocked configuration, the first lower handle frame, the front wheel frame, and the rear wheel frame rotate freely about a second pivot axis of the first frame folding mechanism and the second lower handle frame, the front wheel frame and the rear wheel frame rotate freely about a third pivot axis of the second frame folding mechanism.

14. The method of claim 12, further comprising:
rotating the front wheel frame about the second pivot axis in the first direction;
rotating the stroller seat about the third pivot axis in the first direction; and
rotating the rear wheel frame, lower handle frame, and upper handle frame about the second pivot axis in the second direction.

15. The method of claim 12, further comprising:
rotating the front wheel frame about the second pivot axis in the first direction;
rotating the stroller seat about the third pivot axis in the second direction; and
rotating the rear wheel frame, lower handle frame, and upper handle frame about the second pivot axis in the second direction.

16. The method of claim 12, wherein the stroller further comprises a belly bar comprising a first belly bar rotation mechanism disposed adjacent the first seat folding mechanism, and a second belly bar rotation mechanism disposed adjacent the second seat folding mechanism, wherein the stroller seat comprises a seat back rotatably coupled to a seat bottom, and wherein the method further comprises:
rotating the seat back with respect to the seat bottom from a first in-use configuration to a first folded configuration; and
automatically adjusting the first belly bar rotation mechanism and the second belly bar rotation mechanism from a second locked configuration to a second unlocked configuration in response to rotating the seat back with respect to the seat bottom from the first in-use configuration toward the first folded configuration.

17. The method of claim 12, wherein the stroller seat comprises a seat back and a seat bottom coupled to the stroller frame in a forward-facing configuration in an in-use configuration.

18. The method of claim 12, wherein the stroller seat comprises a seat back and seat bottom coupled to the stroller frame in a rear-facing configuration in an in-use configuration.

19. The method of claim 12, wherein the stroller seat is a seat or a carry cot.

20. A stroller, comprising:
a stroller frame comprising:
a handle frame comprising:
at least one upper handle frame;
a first lower handle frame;
a second lower handle frame;
a first handle frame folding mechanism rotatably connecting the at least one upper handle frame to the first lower handle frame; and
a second handle frame folding mechanism rotatably connecting the at least one upper handle frame to the second lower handle frame;
a front wheel frame;
a rear wheel frame;
a first frame folding mechanism rotatably connecting the first lower handle frame, the front wheel frame, and the rear wheel frame; and
a second frame folding mechanism rotatably connecting the second lower handle frame, the front wheel frame and the rear wheel frame;
a first seat attachment plate rotatably coupled to the stroller frame and configured to attach a portion of a seat or carry-cot to the stroller frame;
a second seat attachment plate rotatably coupled to the stroller frame and configured to attach a second portion of a seat or carry-cot to the stroller frame; and
a seat coupled to the first seat attachment plate and the second seat attachment plate, the seat comprising:
a seat bottom;
a seat back rotatable with respect to the seat bottom about a first axis from an in-use configuration to a folded configuration;
a first seat folding mechanism disposed along a first lateral side of the seat, the first seat folding mechanism comprising a first portion coupled to the first seat attachment plate, a second portion coupled to the seat back, and a third portion coupled to the seat bottom; and
a second seat folding mechanism disposed along a second lateral side of the seat opposite the first lateral side, the second seat folding mechanism comprising a fourth portion coupled to the second seat attachment plate, a fifth portion coupled to the seat back, and a sixth portion coupled to the seat bottom.

* * * * *